United States Patent
Catthoor et al.

(10) Patent No.: US 11,847,944 B2
(45) Date of Patent: Dec. 19, 2023

(54) DATA DISTRIBUTION FOR HOLOGRAPHIC PROJECTION

(71) Applicant: IMEC VZW, Leuven (BE)

(72) Inventors: Francky Catthoor, Temse (BE); Jan Genoe, Testelt (BE); Xavier Rottenberg, Kessel-Lo (BE)

(73) Assignee: IMEC VZW, Leuven (BE)

( * ) Notice: Subject to any disclaimer, the term of this patent is extended or adjusted under 35 U.S.C. 154(b) by 452 days.

(21) Appl. No.: 16/972,838

(22) PCT Filed: Jun. 3, 2019

(86) PCT No.: PCT/EP2019/064374
§ 371 (c)(1),
(2) Date: Dec. 7, 2020

(87) PCT Pub. No.: WO2019/233959
PCT Pub. Date: Dec. 12, 2019

(65) Prior Publication Data
US 2021/0247720 A1   Aug. 12, 2021

(30) Foreign Application Priority Data
Jun. 5, 2018   (EP) .................................... 18176173

(51) Int. Cl.
G09G 3/00     (2006.01)
G09G 3/20     (2006.01)
G03H 1/04     (2006.01)

(52) U.S. Cl.
CPC ........... *G09G 3/003* (2013.01); *G09G 3/2085* (2013.01); *G03H 1/04* (2013.01); *G09G 3/20* (2013.01);
(Continued)

(58) Field of Classification Search
CPC ........ G09G 3/003; G09G 3/2085; G09G 3/20; G09G 2310/0213; G09G 2310/0297; G09G 2310/04; G03H 1/04
See application file for complete search history.

(56) References Cited

U.S. PATENT DOCUMENTS 4,899,307 A * 2/1990 Lenoski .................. G06F 7/785
365/231
5,142,494 A * 8/1992 D'Luna .................... G11C 7/12
365/194

(Continued)

OTHER PUBLICATIONS

PCT International Search Report and Written Opinion, Application No. PCT/EP2019/064374, dated Oct. 11, 2020, 10 pages.

*Primary Examiner* — Michael J Jansen, II
(74) *Attorney, Agent, or Firm* — McDonnell Boehnen Hulbert & Berghoff LLP

(57) ABSTRACT

A system and for distributing data for 3D light field projection and a method thereof. The system comprises input terminals and output terminals that are connectable to pixel elements of a display. Data paths are established between input terminals and output terminals, and are controlled by data switches. The system also comprises a control plane adapted for applying control variables to the data switches. Control switches of the control plane select the control variables which are applied to the data switches. Sequences of control variables and enable variables propagate along at least one first delay line and along at least one second delay line, respectively. Delay units of the at least one first delay line and of the at least one second delay line have a synchronous relationship. During system run-time patterns contained in the stream of input data are detected for determining the sequences of control variables.

15 Claims, 10 Drawing Sheets

(52) U.S. Cl.
CPC .............. *G09G 2310/0213* (2013.01); *G09G 2310/0297* (2013.01)

(56) References Cited

U.S. PATENT DOCUMENTS

| | | | | |
|---|---|---|---|---|
| 5,901,092 A * | 5/1999 | Tran | ................... | G11C 8/00 |
| | | | | 365/194 |
| 7,230,615 B2 * | 6/2007 | Wang | ................ | G09G 5/006 |
| | | | | 345/212 |
| 7,237,055 B1 | 6/2007 | Rupp | | |
| 8,018,416 B2 * | 9/2011 | Meng | ............... | H03K 17/693 |
| | | | | 345/98 |
| 8,996,430 B2 * | 3/2015 | Modha | .............. | G06N 3/049 |
| | | | | 706/15 |
| 9,086,682 B2 * | 7/2015 | Choe | ................ | G09G 3/3666 |
| 9,148,134 B2 * | 9/2015 | Shibuya | ........... | H03K 5/1506 |
| 9,251,757 B2 * | 2/2016 | Suzuki | ............ | G09G 3/3688 |
| 9,626,925 B2 * | 4/2017 | Cheng | ............. | G09G 3/3648 |
| 9,905,159 B2 * | 2/2018 | Genoe | ............. | G09G 3/3258 |
| 10,621,943 B2 * | 4/2020 | Higuchi | .......... | G09G 3/3674 |
| 10,643,553 B2 * | 5/2020 | Gu | .................. | G09G 3/3426 |
| 10,802,743 B2 * | 10/2020 | Catthoor | ............ | G11C 16/04 |
| 10,847,068 B2 * | 11/2020 | Christmas | .......... | G03H 1/02 |
| 11,232,824 B1 * | 1/2022 | Gong | ................. | G11C 7/1006 |
| 11,450,282 B2 * | 9/2022 | Park | .................. | G09G 3/3275 |
| 2004/0085309 A1 * | 5/2004 | Wang | ................ | G09G 5/006 |
| | | | | 345/204 |
| 2008/0074168 A1 * | 3/2008 | Meng | ............... | H03K 17/6871 |
| | | | | 327/434 |
| 2008/0238895 A1 * | 10/2008 | Lin | ..................... | G09G 3/20 |
| | | | | 345/204 |
| 2010/0309179 A1 | 12/2010 | Missbach | | |
| 2011/0316821 A1 * | 12/2011 | Suzuki | ............ | G09G 3/3688 |
| | | | | 345/204 |
| 2013/0100181 A1 * | 4/2013 | Choe | ................ | G09G 3/3666 |
| | | | | 345/691 |
| 2013/0141403 A1 * | 6/2013 | Shibuya | ............ | G09G 3/36 |
| | | | | 345/204 |
| 2015/0058268 A1 * | 2/2015 | Modha | ............. | G06N 3/063 |
| | | | | 706/27 |
| 2015/0302795 A1 * | 10/2015 | Genoe | ............. | G09G 3/3648 |
| | | | | 345/691 |
| 2016/0284297 A1 * | 9/2016 | Cheng | ............. | G09G 3/3648 |
| 2017/0011703 A1 * | 1/2017 | Higuchi | .......... | G09G 3/3674 |
| 2019/0034111 A1 * | 1/2019 | Catthoor | .......... | G06F 3/0646 |
| 2019/0180700 A1 * | 6/2019 | Gu | ................... | G09G 3/3426 |
| 2019/0295449 A1 * | 9/2019 | Christmas | .......... | G09G 3/003 |
| 2022/0044641 A1 * | 2/2022 | Park | ................... | G09G 3/3275 |

* cited by examiner

DATA DISTRIBUTION FOR HOLOGRAPHIC PROJECTION

CROSS-REFERENCE TO RELATED APPLICATIONS

The present application is a national stage entry of PCT/EP2019/064374, filed Jun. 3, 2019, which claims priority to EP 18176173.5, filed on Jun. 5, 2018, the contents of each of which are hereby incorporated by reference.

FIELD

The present disclosure relates to energy-efficient data distribution systems and methods in general and, more particularly, relates to data distribution systems and methods for partial display updates in holographic light projection devices.

BACKGROUND

In conventional display application, pixel values are refreshed periodically in a row-wise manner. Updating the display given a new frame of video content data thus may require an entire scan of the display area which entails a dead time during which the pixel values of a display cannot be updated and an amount of energy spent to distribute and upload the new video content data of frames to all the display pixels. Consequently, a well-performing, underlying data distribution hardware is desired which can cope with the timely and energy-efficient distribution and updating of large data volumes in a received stream of input video data. This is particularly important in the case of high resolution displays having a large amount of pixels that may need regular updating, and is even more important in compact displays offering enhanced viewing comfort and capabilities, e.g. stereoscopic displays or 3D displays such as 3D light field displays or holographic displays offering depth perception, for a single viewer or multiple viewers, at large viewing angles.

Known examples of systems for data distribution or for dynamic addressing (for write and read) of data are crossbar switch designs or DRAM memory access technology. For the former the number of switching components grows quadratically and does not provide a sufficiently energy-efficient solution when scaling up the access bandwidth; the latter is conventionally overwriting an entire row concurrently even if only one data location may need updating. Moreover, at least for volatile CMOS designs the distributed, stored data may require regular refreshing, typically in the millisecond range.

SUMMARY

Embodiments of the present disclosure provide an efficient high throughput-low latency system for distributing data for 3D light field and holographic projection The above aspect s accomplished by a method and device according to the present disclosure.

In a first aspect, the present disclosure relates to a system for distributing data for 3D light field projection. It comprises a plurality of input terminals which are suitable for receiving a stream of input data, and a plurality of output terminals which are connectable to pixel elements of a display. A plurality of data paths exists between input terminals and output terminals and a plurality of data switches are suitable for controlling, via control variables, a transfer of input data, when received at the input terminals, on a data path. The system for distributing data further comprises a control plane which is adapted for applying control variables to the data switches. The control plane includes a plurality of control switches for selecting, via enable variables, one or more control variables from sequences of control variables and for applying the one or more control variables to the data switches. At least one first delay line suitable for propagating sequences of control variables, and at least one second delay line suitable for propagating sequences of enable variables are also included in the control plane. The at least one first delay line and the at least one second delay line are comprising each one or more delay units. Each of the one or more delay units of the at least one first delay line are in a synchronized relationship with exactly one of the one or more delay units of the at least one second delay line. The system for distributing data also comprises means for detecting patterns contained in the stream of input data, when received during system run-time. The detected patterns are determining the sequences of control variables.

In example embodiments of the present disclosure, a selection of control variables provides partial updating of the holographic image data applied to the connectable pixel elements of a display, whereby an energy per area unit overhead is reduced.

In example embodiments of the present disclosure, control variables are sequentially sent on short delay lines having a lower capacitive load and shorter latency.

In example embodiments of the present disclosure, control variables or entire control sequences can be stored on the data switches for a long time without being refreshed.

In example embodiments of the present disclosure, the means for detecting patterns may include a run-time engine which is deciding on the selection of update patterns for the control plane, which positively influences the energy-efficient use of the system.

In example embodiments of the present disclosure, the control plane design reduces a routing overhead, thereby providing an energy- and area efficient data distributing system.

In example embodiments of the present disclosure, high input data volume traffic is handled by the system and high throughput rates are achieved.

According to some embodiments of the present disclosure, the system for distribution data further comprises means for carrying out local postprocessing computations on transferred input data for at least one of the plurality of output terminals.

The means for carrying out local postprocessing computations may, in particular embodiments of the present disclosure, comprise local data decoders operating on transferred input data.

In other embodiments of the present disclosure, the means for carrying out local postprocessing computation may comprise a circuit for identifying whether newly transferred input data for at least one of the plurality of output terminals has been changed compared to input data previously transferred to that output terminal.

For some embodiments of the present disclosure, the means for detecting patterns may also be adapted to control the execution of local postprocessing computations.

In some embodiments of the present disclosure, disclosure local postprocessing computation may be carried out on a local level and in a distributed fashion. This allows for more postprocessing functionality and an increased pixel-level control.

In some embodiments of the present disclosure, local decoding means may reduce the number of wires necessary for input data transfer, and to allow a more compact representation of input data by means of input data compression. Higher input data throughput rates are therefore achievable.

In some embodiments of the disclosure, many devices may be implemented locally, without the need for latches or registers, e.g. the case in CMOS logic, and that the many devices may perform postprocessing computations independently form each other in a distributed fashion.

In some embodiments of the present disclosure, already transferred input data is reused locally. Therefore, redundant writing of input data to a pixel element may be avoided and the data distributing system is operating in a more energy-efficient way.

According to some embodiments of the present disclosure, a synchronized relationship between each of the one or more delay units of the at least one first delay line with exactly one of the one or more delay units of the at least one second delay line is established by a synchronous clock signal distributed to the one or more delay units of the at least one first and second delay line. This provides precise control of delay times of the various delay units and near perfect matching of delay times may be obtained.

According to some embodiments of the present disclosure, a synchronized relationship between each of the one or more delay units of the at least one first delay line with exactly one of the one or more delay units of the at least one second delay line is established by clock-free wave-pipelining, circuits. This is desired since there is no need for clock distribution circuitry and an associated clock load is avoided. Therefore, a very energy-efficient implementation of the data distributing system may be provided.

According to some embodiments of the present disclosure, the plurality of data switches and/or the plurality of control switches comprises at least one thin film transistor (TFT). This has the benefit that TFT backplane technology may be used to stack multiple layers in a back-end-of-line process, each layer comprising thin film transistors and being connected to the next layer via intermediate metal layers.

In some embodiments of the present disclosure, TFT devices with larger nodes are manufactured at a lower cost.

In some embodiments of the present disclosure, TFT devices with a high threshold voltage allow better long term storage of control data.

For some embodiments of the present disclosure, the TFT devices may be implemented in IGZO materials, which is beneficial, as this allows for very low leakage currents.

According to some embodiments of the present disclosure, the system for distributing data further comprises means for generating sequences of control variables and/or means for generating sequences of enable variables. These sequence generating means may, in particular embodiments of the present disclosure, be algorithms for compression and holographic data transformations which are running on a computing device off-line. The compressed and/or transformed data may be stored on disks from which it is streamed to the system for distributing data.

In a second aspect, the present disclosure relates to 3D light field projection device which comprises a system for distributing data according to any of the embodiments of the first aspect, and a display comprising pixel elements arranged on a display surface. Each output terminal of the plurality of output terminals is connected to and addresses at least one pixel element such that a transfer of received input data to output terminals is causing a updating of the addressed pixel elements.

A group of pixel elements (e.g. color pixels, block of pixels in coarse rendering) may be addressed by one only output terminal, which further reduces the wiring overhead. A single pixel element may be addressed by a group of output terminals (e.g. phase and intensity information). In example embodiments, the display can be updated partially, which reduces the power consumption of the device.

According to some embodiments of the present disclosure, the sequential selection of each control variable from a sequence of control variables propagating along the at least one first delay line defines a corresponding sequence of pixel elements or groups of pixel elements being addressed such that a curve sequentially connects the pixel elements or groups of pixel elements of the corresponding sequence on the display surface.

According to the same or other embodiments of the present disclosure, one sequence of control variables is determining at least one curve of updated pixel elements or groups of pixel elements on the display surface. The updated pixel elements or groups of pixel elements along the at least one curve are addressed sequentially by the order of selection of control variables from the sequence and the at least one curve does not intersecting itself on the display surface.

This is desirable because partial updating of the display occurs only in a local area of the total display, whereby spatial correlations in the image content are exploited more easily. Non-intersecting curves of sequentially addressed pixel elements or groups of pixel elements are given by the less complex and more compact design layout.

According to the same or other embodiments of the present disclosure, one sequence of control variables is determining at least one curve of updated pixel elements or groups of pixel elements on the display surface. The updated pixel elements or groups of pixel elements along the at least one curve are addressed sequentially by the order of selection of control variables from the sequence and the at least one curve is connecting neighboring pixel elements or groups of pixel elements of the display.

Partial updating of the display along at least one curve connecting nearest neighbor pixel elements or groups of pixel elements on the display avoids or reduces the length of wire routing.

According to the same or other embodiments of the present disclosure, at least one curve is a space-filling winding curve along which straight curve segments are joined by right-angled turns such that the curve connects all the pixel elements belonging to a connected region of the display.

disclosure This organization of the display plane leads to a geometry which allows for compact spatial clusters which do not require long chain lengths. Therefore, shorter wiring distances may be obtained, resulting in lower latencies.

According to some embodiments of the present disclosure, a plurality of curves on the display surface are defined and each curve is a straight line on the display surface. A straight line corresponds to a row of pixel elements of the display.

Addressing pixel elements of the display by rows allows easier routing/floor planning.

According to some embodiments of the present disclosure, each pixel element comprises electrically controllable phase change material.

In embodiments of the present disclosure existing phase change material technology is used for implementing pixel elements, resulting in a fully integrated solution offering fast and efficient electronic control of pixel elements with memory.

According to some embodiments of the present disclosure, a plurality of disjoint clusters of pixel elements provides a spatial partitioning of the display, the pixel elements of each cluster having similar update rates for each stream of input data out of a collection of representative streams.

Clusters of pixel elements can be assigned at design time based on prior knowledge gathered by profiling. Therefore, an energy- and resource efficient system may be implemented.

According to some embodiments of the present disclosure, the projection device further comprises a splitter for splitting a received stream of input data into several smaller chunks of input data and for applying these smaller chunks of input data to the data input electrodes of more than one cluster.

In some embodiments of the present disclosure, the data distributing system can handle very high data rates, e.g. in can support terabits per second (Tbps) data transfer rates, which are necessary for a high enough frame rates/display update rates which give the viewer(s) an impression of continuity. By breaking up the input data in more chunks, also the latency of the system can be controlled, so as to stay quite low when needed.

According to some embodiments of the present disclosure, a shape of each of the plurality of disjoint clusters in the display plane is assigned at design-time, based on histograms obtained through profiling of the system for distributing data, when fed with a collection of representative streams.

Cluster shapes can be utilized for a particular application with regard to energy-efficiency, image quality, etc. Existing representative video data may be efficiently exploited to utilize the cluster shapes and cover many possible applications.

According to some embodiments of the present disclosure, the profiling of the system for distributing data is obtained by simulating it in software. According to other embodiments of the present disclosure, the profiling of the system for distributing data is obtained by emulation in hardware.

According to some embodiments of the present disclosure, the update rates of pixel elements of each cluster are adapted dynamically, at run-time, by the means for detecting patterns. This allows for a flexible design in which clusters assigned at design-time are efficiently exploited during system run-time.

In a third aspect, the present disclosure describes a method for of distributing streams of concurrent input data to a 2D or 3D storage medium for writing. First, streams of concurrent input data are provided and applied to one or more input terminals. Patterns contained in the stream of concurrent input data are then detected and sequences of control variables are determined as a function thereof. Next, the sequences of control variables are injected into at least one first delay line and at least one enable variable is injected into at least one second delay line. The at least one first delay line and the at least one second delay line each comprise one or more delay units. Each of the one or more delay units of the at least one first delay line are in a synchronized relationship with exactly one of the one or more delay units of the at least one second delay line. Control variables from one of the sequences of control variables propagating along the at least one first delay line are selected and the selected control variables are applied to data switches such that data paths between input terminals and output terminals are established. Furthermore, a plurality of control switches is controlling the selection of control variables. A state of each control switch depends on the at least one enable variable propagating along the at least one second delay line. Eventually, concurrent input data is transferred along each of the established data paths such that transferred input data at an output terminal can be written to a memory location of a connectable 2D or 3D storage medium.

Particular aspects of the disclosure are set out in the accompanying independent and dependent claims. Features from the dependent claims may be combined with features of the independent claims and with features of other dependent claims as appropriate and not merely as explicitly set out n the claims.

For purposes of summarizing the disclosure, certain aspects of the disclosure have been described herein above. It is to be understood that not necessarily all such aspects may be achieved in accordance with any particular embodiment of the disclosure. Thus, for example, those skilled in the art will recognize that the disclosure may be embodied or carried out in a manner that achieves one aspect as taught herein without necessarily achieving other aspects as may be taught or suggested herein.

The above and other aspects of the disclosure will be apparent from and elucidated with reference to the embodiment(s) described hereinafter.

BRIEF DESCRIPTION OF THE DRAWINGS

The disclosure will now be described further, by way of example, with reference to the accompanying drawings, in which.

Figure 1:
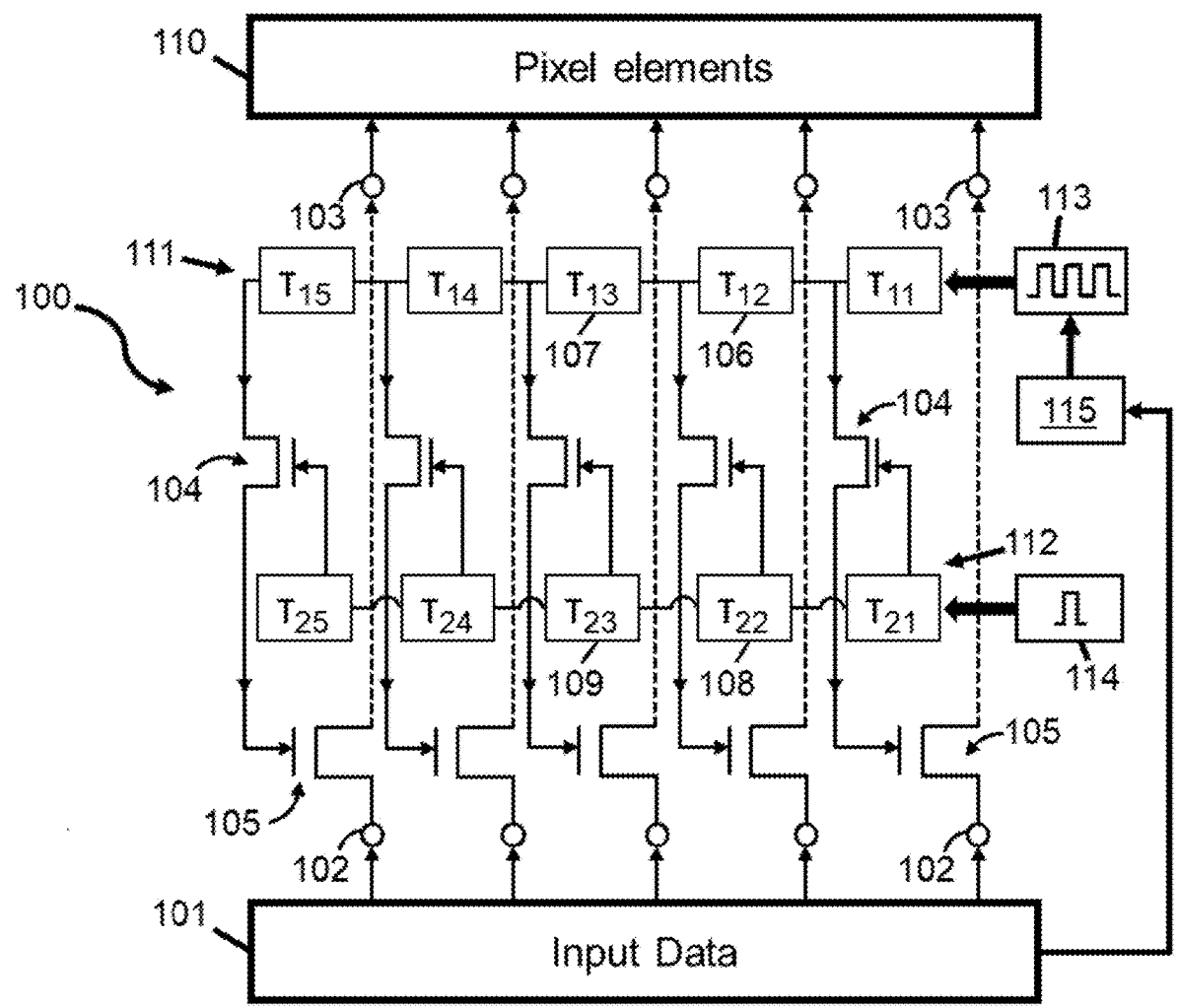
FIG. 1 is a schematic of a system for distributing data which may be used in embodiments of the present disclosure, wherein the control plane includes a single control chain.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Any reference signs in the claims shall not be construed as limiting the scope.

In the different drawings, the same reference signs refer to the same or analogous elements.

DETAILED DESCRIPTION

The present disclosure will be described with respect to particular embodiments and with reference to certain drawings but the disclosure is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, directional terminology such as top, bottom, front, back, leading, trailing, under, over and the like in the description and the claims is used for descriptive purposes with reference to the orientation of the drawings being described, and not necessarily for describing relative positions. Because components of embodiments of the present disclosure can be positioned in a number of different orientations, the directional terminology is used for purposes of illustration only, and is in no way intended to be limiting, unless otherwise indicated. It is, hence, to be understood that the terms so used are interchangeable under appropriate circumstances and that the embodiments of the disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of some embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art.

It should be noted that the use of particular terminology when describing certain features or aspects of the disclosure should not be taken to imply that the terminology is being re-defined herein to be restricted to include any specific characteristics of the features or aspects of the disclosure with which that terminology is associated.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Definitions

A control chain, as referred to in figures and embodiments of the detailed description, corresponds, in the context of the present disclosure, to a portion of the control plane that includes all the elements necessary to steer the distribution of input data to the location(s) where it is used to modify pixel elements of a display operatively coupled to the data distributing system. So the control chain also steers the full or partial update of these pixel elements. The actual distribution of input data is performed by switches which belong to the data plane of the data distributing system. The control plane may comprise several control chains, each control chain being adapted for steering input data to specific locations and locations addressed by different control chains may overlap.

Figures and embodiments of the disclosure having data input electrodes and data output electrodes as its respective input and output terminals are described hereinafter. The skilled person will appreciate, however, that embodiments of the disclosure are not limited to electrodes and that any type of suitable electrical contact or electrical connector ay be provided as an input or output terminal.

Some embodiments of the disclosure are commonly referring to holographic displays/projectors as an example for 3D light field creating displays or projection devices; the terms holographic display and holographic projector are used interchangeably in the sense that they enable viewing of a full 3D scene. This does not exclude other displays or projection devices creating 3D light fields from falling under the scope of embodiments of the second aspect of the disclosure. The skilled person would know, for example, how to encode, format, or organize a stream of 4D light field information for projection with a (near-eye) light field display such that the encoded, formatted, or organized stream can be distributed with a data distributing system in accordance with embodiments of the first aspect of the disclosure. A similar reasoning also applies to data distributing systems in non-projecting displays with or without depth perception, e.g. to autostereoscopic lenticular displays which use microlenses and define macro-pixels to achieve non-uniform angular lighting and depth perception. As a consequence, scaled, denser, and larger pixel arrays are striven for in 3D applications of 2D displays augmented by lens arrays. More generally, the disclosure may also be put into practice for data distributing systems in standard 2D displays having a large pixel densities and/or large pixel count, e.g. compact LCD or TFT 2D displays having millions of pixels, the latter being non-limiting examples of projection-free devices, i.e. suitable for direct viewing. Furthermore, the present disclosure can be applied to any display where partial dynamic updates are useful and may require energy-efficient, high-throughput, low-latency data distribution. High-throughput, low-latency data distribution in the context of above cited example of a holographic projector implies dense data throughputs exceeding 10 Gbits/cm$^2$ for adequate resolution also with blue light at sub-wavelength ranges, e.g. at quarter wavelength resolution. This data is likely to be distributed at typical frame rates for fluid motion perception without flicker, e.g. at 24 fps, 48 fps, etc. This frame rate may triple for a three-color display. Thus, for typical pixel counts beyond 1MegaPixel and 24-bit color depth, a low-latency data distributing system supports overall data throughput rates beyond 0.5 Gbit/sec, and data throughput densities beyond 1 Tbit/sec/cm$^2$. In example embodiments, the related power consumption ranges below a few Watts, and in some examples below a few milliwatts. If the system operation at the maximum performance (speed) cannot be met, additional parallelism is introduced to cope with the expected overall system specifications, applies.

A system for distributing data according to embodiments of the first aspect of the present disclosure is now described referring to FIG. 1. The data distributing system is described in relation to a holographic display/projector, but is not limited to this and may be used in other display or projector applications as well, for instance in 3D light field display applications in general, in 3D microlens displays, in 2D LCD displays applications with high pixel counts and/or pixel densities, etc. It may be implemented as the last layer of a multistage switching network for routing of data, in which case the input data for distribution according to the present disclosure corresponds to the pre-routed data obtained at this last layer. If this is the case the control plane of the system for distributing data may coincide with the control plane steering the routing of data through the pre-routing switching fabric, e.g. by using control chains too. Some embodiments of the disclosure are described as having only a single stage of data switches for distribution of input data, the present disclosure is not limited to those embodiments. For example, it is possible to have two or more stages of data switches for distributing the input data from a start position to a target position, the two or more stages of data switches in the data plane being well orchestrated by the control plane. However, the last layer of a multistage system is of capital concern in holographic display/projector applications, as it controls the distribution of input data to the pixel elements of a display, i.e. it is desired for controlling how pixel elements are updated.

FIG. 1 depicts schematically a system for distributing data 100 including a plurality of data paths between a plurality of data input electrodes 102 and a plurality of data output electrodes 103. Data switches 105 (as part of the data plane) are arranged along the data paths for managing the transfer of input data 101 on these data paths. Data paths between data input electrodes 102 and data output electrodes 103 may overlap in parts, e.g. data paths starting at one and the same data input electrode 102 but ending at different data output electrodes 103 share a common section. A control plane comprises a plurality of control switches 104 and a first and a second delay line 111, 112. The system 100 further comprises means 115 for detecting patterns contained in the stream of input data 101 during system run-time. Data input electrodes 102 of the system for distributing data 100, e.g. data input electrodes at the end of a multi-bit transmission line, are suitable for receiving a stream of input data 101 when the system 100 is in use, that is, when input data 101 is received and distributed to connectable pixel elements 110 of a display for uploading and updating signals at the pixel elements 110. Each data switch of the plurality of data switches 105 is connected to a data input electrode 102 and to a data output electrode 103 to distribute in a controlled manner the received stream of input data 101 from the data input electrodes 102 towards the data output electrodes 103. In some embodiments of the disclosure, each data switch 105 is connected to exactly one data input electrode 102 and to exactly one data output electrode 103. In other embodiments of the disclosure, each data switch 105 may be connected to one data input electrode 102 and to several data output electrodes 103.

The data output electrodes 103 are connectable to pixel elements 110 of a display, e.g. a holographic display. The connection to the pixel elements 110 may be such that exactly one data output electrode 103 is connected to one pixel element. More generally, more than just one data output electrode 103 may be connected to one pixel element (e.g. to parallelize the number of bits that can be written to a pixel element concurrently or separate information on intensity and phase levels for each pixel element). The system 100 for distributing data comprises a control chain containing elements to steer the distribution of input data 101 from the input electrodes 102 to the output electrodes 103. Such control chain of the system for distributing data 100 comprises a first delay line 111, and control switches 104 which are electrically coupled to the first delay line 111 and to the data switches 105. The electrical coupling is such that, if a control switch 104 is in a predetermined state, e.g. an on-state for which it is conducting, a control variable propagating along the first delay line 111 is selected and directed towards at least one of the data switches 105, whereby a transfer of input data 101 from corresponding data input electrodes 102 towards corresponding data output electrodes 103 is controlled. The control switches 104 are also operatively connected to a second delay line 112 so as to receive enable variables that control the switching events of the control switches 104. As more extensively described in EP17182232.3, incorporated herein by reference, the first delay line 111 comprises one or more delay units 106, 107 and is in a synchronized relationship with the second delay line 112, which also includes one or more delay units 108, 109. The synchronized relationship between both delay lines may be established by pairwise matching of delay units of both delay lines. For example, a delay time $\tau 22$ of a delay unit 108 of the second delay line 112 is determined as a function of a delay time τ12 of a corresponding delay unit 106 of the first delay line 111, and a delay time τ23 of a delay unit 109 of the second delay line 112 is determined as a function of a delay time τ13 of a corresponding delay unit 107 of the first delay line 111, etc. in some embodiments of the disclosure, it may be desired to design corresponding delay units of first and second delay line such that the delay time τ22 of a delay unit 108 of the second delay line 112 is, within error margins that are acceptable for a given application, twice the delay time τ12 of the corresponding delay unit 106 of the first delay line 111, the delay time τ23 of a delay unit 109 of the second delay line 112 is, within the error margins, twice the delay time τ13 of the corresponding delay unit 107 of the first delay line 111, etc. This synchronized relationship between delay units 106, 107 of the first delay line 111 and delay units 108, 109 of the second delay line 112 has the effect that an enable variable (propagating along the second delay line 112) is aligned temporally with successive control variables composing a sequence of control variables (propagating along the first delay line 111), each time it advances by one delay unit 108, 109. Equivalently, the synchronized relationship states that an offset in time between two sequences, e.g. a control sequence of control variables and an enable sequence of enable variables, is increased in a controlled fashion. The two sequences are co-propagating on the first and second delay line 111, 112. In an example embodiment, delay units 108, 109 of the second delay line 112 may be provided as clocked 2-bit shift registers, whereas corresponding delay units 106, 107 of the first delay line 111 may be provided as 1-bit shift registers clocked by the same clock signal as the 2-bit shift registers of the second delay line 112. In another example embodiment, delay units 106, 107, 108, 109 may be provided by flip-flops or registers which are not synchronized by a common clock signal, but wherein the temporal alignment of an enable variable with successive control variables is achieved by wave-pipelining circuitry, e.g. by the controlled insertion of delay buffers into the second delay line 112. In yet another example embodiment, delay units 106, 107, 108, 109 may be provided as transmission line segments which can be modeled and built as lumped RC circuits. A careful matching of resistance values and capacitances of transmission line segments results in the desired control of the time offset between the two co-propagating, sequences. A delay time of a delay unit 108, 109 of the second delay line 112 is not necessarily exactly twice a delay time of a corresponding delay unit 106, 107 of the first delay line 111. There exists some degree of tolerable variability as long as sufficient temporal overlap between an enable variable and successive control variables is ascertained. For instance, the enable variable may be chosen to be a pulse which is present or absent, and likewise for control variables. A shorter pulse duration for the enable variable, e.g. 10% shorter, compared to control variable pulse durations provides some flexibility in terms of time jitter in the offset during propagation. It may therefore be possible that a delay time τ22 of a delay unit 108 of the second delay line 112 is 2.1 times, instead of a targeted value of 2.0, the delay time τ12 of the corresponding delay unit 106 of the first delay line 111, and the delay time τ23 of a delay unit 109 of the second delay line 112 is 1.9 times, instead of a targeted value of 2.0, the delay time τ13 of the corresponding delay unit 107 of the first delay line 111, etc.

In some embodiments of the disclosure, the first delay line 111 and/or the second delay line 112 may be conceived to propagate control variables or enable variables which are represented as multiple bits. In other embodiments of the disclosure, the first delay line 111 and/or the second delay line 112 may be conceived to propagate control variables or enable variables which are represented as single bits.

The means for providing input data 101, e.g. data transfer means for transferring input data 101 from a storage medium to the data distributing system, and possibly through a pre-routing network, may be included in the data distributing system 100 or may be external to it. The input data 101 may, but not limited thereto, be transferred from an external storage disk of a computer or server to the data distributing system 100 via a wire connection or a wireless connection.

In particular embodiments, the input data 101 is encoded and/or compressed so as to achieve suitable error correction and/or data compression of the stream of input data 101 with higher data transmission, distribution and display update rates being obtained. For some applications, the input projection data 101 may be preprocessed input data, obtained off-line, e.g. compressed and/or encoded input data, and/or input data transformed for holographic data projection, and the so preprocessed input data is then stored on a suitable storage medium, e.g. storage disks on a computer, from which it is retrieved and streamed to the data distributing system 100 when it is operative. In the context of the present disclosure, the input data 101 typically represents a primitive out of a pre-defined set of primitives forming a representative, high-level description of a 3D scene. Each primitive is then interpreted in a local decoding and/or local postprocessing step and results in a physical representation of the 3D scene information at the level of individual or groups of pixel elements of the (holographic) display, e.g. as optical phase and/or amplitude distributions for light interacting with the display. As an example, one may imagine a point in 3D space constitutes the whole 3D scene. A physical representation of this 3D scene point at the level of individual or groups of pixel elements of the (holographic) display may correspond to transmission modulated pixel elements of the display exhibiting quasi-continuous or discrete versions of Fresnel zone plates, or to phase modulated pixel elements of the display mimicking Fresnel lens profiles. A primitive may then address the transmissivity/reflectivity or the phase response of an entire ring of pixel elements or an arcuate portion thereof.

In some embodiments of the disclosure, the streamed input data 101 may be split into several smaller chunks of input data 101 being applied to the data input electrodes 102 associated with more than one control chain. The data distributing system 100 according to embodiments of the present disclosure can handle very high data rates, e.g. in can support terabits per second (Tbps) data transfer rates, which are necessary fora high enough frame rates/display update rates that give the one or more viewers an impression of continuity. By breaking the input data 101 up into chunks, also the latency of the system 100 can be controlled, so as to stay as low as possible when needed.

Means 115 for detecting patterns contained in the stream of input data 101 may receive and analyze streamed input data 101 (e.g. primitives contained therein or their interpreted counterparts, i.e. their decoded representations), and in response thereto, may send instructions to one or more control chains. Non-limiting examples of such instructions are, among others, instructions for updating the sequences of control variables applied and stored at the data switches 105 or instructions to local computation means for repeating a postprocessing step of already distributed input data, but with updated parameters. Patterns which are analyzed and detected by the pattern detection means 115 may encompass translations, rotations, and scale transforms of the whole 3D scene to be displayed or only parts thereof. Detection of these patterns is useful as the primitives change in a deterministic way under these patterns, e.g. under translations (e.g. moving object of a 3D scene) or rotations (e.g. rotating object of a 3D scene). A modification of the already transferred input data by virtue of local postprocessing/re-computation may be more energy efficient under these circumstances as compared to starting a complete new cycle of input data reloading and redistribution. While above described patterns are all implying functional transformations of the input data 101, also dynamic patterns may be analyzed and detected. The dynamic patterns are concerned with temporal aspects of input data 101 distribution, for instance, at which rates data output electrodes 103 are updated. Under normal conditions it is expected to have display regions which have quickly evolving image or scene content potentially requiring frequent updates, meaning frequent updating/overwriting, of input data 101 to the data output electrodes 103 corresponding to these regions, whereas other regions of the display may have image or scene content which is slowly evolving and thus may require less frequent distribution and overwriting of input data 101. That is, the plurality of data output electrodes 103 are only partially updated at every display refresh cycle. Therefore, means of detecting patterns 115 may also be configured for detecting quasi-static patterns in the input data 101 updates over some period of time. For these quasi-static input data 101 upload patterns the control chains of the control plane do not undergo an updating action, which enables a more energy-efficient use of the control plane. For this purpose, the means for detecting patterns may compare how quickly detected attributes of a primitive for update change or detect if a whole new primitive is updated. A stable input data 101 upload pattern detected over some segmented, non-overlapping region of the display is typically associated with a cluster of data output electrodes 103 and a constant sequence of control variables stored on the data switches 105. Hence, the input data 101 update rates of one cluster are tied together as long as the quasi-static pattern persists (and a sequence of control variables is not renewed), which may be an approximation to the actual input data 101 update rates of the streamed input data 101. However, this approximation is allowed as long as the neglected deviations would not contribute or not critically contribute (e.g. by significantly affecting the image quality) to a change in the reconstructed 3D scene if they were accounted for in every refresh cycle.

In some examples, the means for detecting patterns 115 may also detect input data 101 which is identical to the one previously transferred to a particular data output electrode 103. This also applies within the detected quasi-static patterns. In this case input data 101 is may not be distributed again for overwriting; the old one and also local postprocessing is unnecessary. This is achieved by keeping the respective data switches 105 closed once the reusable input datum has been transferred for the first time, i.e. the respective data switches 105 (e.g. high threshold voltage transistor devices) act like a pass gate.

Pattern detection may be applicable to input data 101 update events at each data output electrode 103, or to updating events of a cluster of data output electrodes 103 corresponding to clustered regions of a connected display addressed thereby. Detected patterns for the input data 101 update events may be subject to a thresholding operation, deciding whether or not the detected pattern shall be used as an input for local postprocessing of already distributed input data 101. If not used to initiate local postprocessing, it may trigger the reloading and redistribution of new input data 101. A rapidly moving object in a 3D scene, for instance, may require a more frequent input data 101 updating, e.g. fresh input data to be distributed, as compared to a slowly rotating object of a 3D scene for which there is time enough to reprocess the already distributed input data 101 still present at one or several clusters of data output electrodes 103, e.g. clusters of data output electrodes whose dominant solid angles support the rotating 3D object of the scene. As a consequence, control variables belonging to one or more control chains that steer the distribution of input data 101 are only updated if strictly necessary in order to ameliorate energy efficiency. The necessity criterion generally depends on the target application and/or desired image quality. As a result, the system for distributing data 100 is adapting dynamically to a more efficient way of input data 101 distribution. If a new sequence or new sequences of control variables become necessary, e.g. in response to a detected pattern beyond a threshold value or no detected patterns, those are determined by the control plane and provided to the first delay line 111 for injection (or first delay lines if several control chains are involved). Updating of the control variables at respective data switches 105 is achieved by simultaneously generating and injecting into the second delay line 112 an enable sequence, e.g. a travelling "one" (single pulse). The means for generating the sequences of control variables 113 and the means for generating the sequences of enable variables 114 may be included in the control plane structure of the data distributing system 100, but may also be provided as external sequence generating means, e.g. as programmable bit pattern generators, FPGAs, or other computing hardware implementations.

Figure 2:
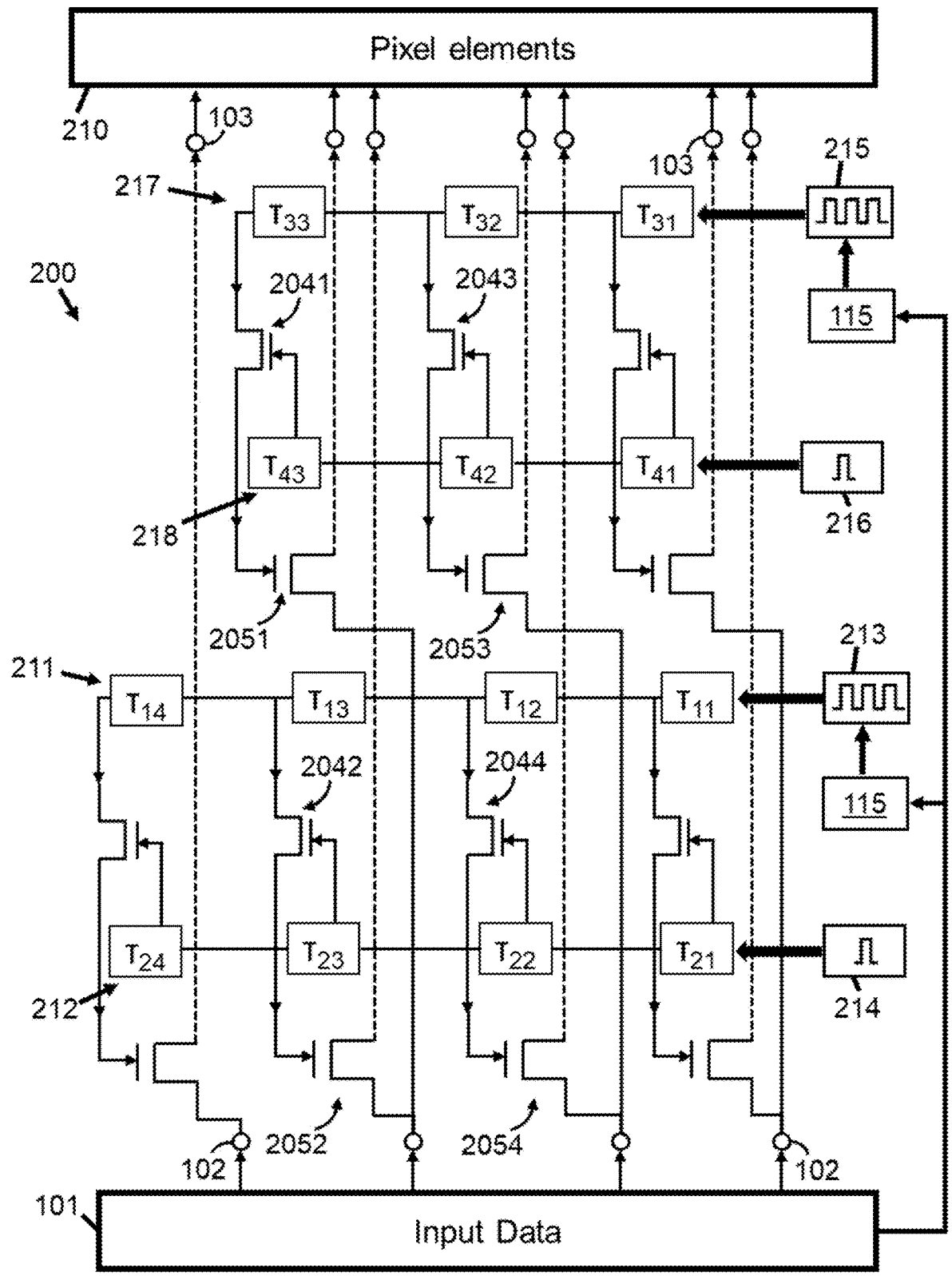
FIG. 2 is a schematic of a data distributing system which may be used in embodiments of the present disclosure, wherein the control plane includes two different control chains.

An example of a rapid change of input data 101, corresponding to fast input data distribution and update rates at the data output electrodes 103 (and corresponding pixel elements 110 of the display), is a complete scene change in the transferred associated data, e.g. video data. Moving objects in the foreground of a static scene or sudden texture changes in slowly moving and static objects are other non-limiting examples of video content data that induces a change in input data 101 update rates (if no local postprocessing is available) and/or allows for a segmentation/clustering of the holographic display surface, and hence of the underlying data output electrodes 103, into regions of high input data 101 update rates, e.g. a triggered by a moving object or a texture change which may require update rates of the order of 100 frames per second (fps), and regions of moderate or low input data 101 update rates, e.g. triggered by static backgrounds or slowly moving objects which may require update rates significantly less than 100 fps or no updating at all. These clustered regions may be supported by rectangular sub-matrices of the larger matrix of pixel elements 110 of the connected display, or may be supported by circular sections of the larger matrix of pixel elements 110. The skilled person will know that other choices are possible. Small imperfections in the reconstituted 3D scene may be tolerable. Therefore, some regions may not require updating if the 3D scene is partially modified, for instance, regions whose dominant solid angles support parts of the 3D scene that do not change during the modification. Hence, it is possible to study a representative ensemble of streams of input data 101, including large varieties of video scenes and image contents, and to profile the update rates of addressed data output electrodes 103, which, if connected to their respective pixel elements 110 of a holographic display, would recreate the video scene or image content once it has been successfully distributed. This profiling happens during design-time of the data distributing system 100. It may, for example, comprise the recording of histograms which are informative on the distribution of update rates across the plurality of data output electrodes 103 for a given scene scenario. As a result of this design-time profiling, e.g. by emulation or simulation of the data distributing system 100, clusters of data output electrodes 103 can be identified that have similar input data 101 update rates for a given scenario. The display plane, and hence the plurality of underlying data output electrodes 103 is therefore partitioned into a plurality of disjoint clusters. Each of the so identified clusters of data output electrodes 103 may be provided with a separate control chain in the control plane of the data distributing system 100. A control chain provides the necessary system infrastructure to realize the changes in the update rates. Since changes in the update rates correspond to updates in the control variables of the data switches 105, a single control chain provides all the elements of the control plane discussed so far, i.e. first and second delay lines 111, 112, and a plurality of control switches 104. However, the control plane as a whole may comprise a plurality of control chains, because the control plane as a whole is controlling all the clusters identified. An example embodiment of the disclosure as shown in FIG. 1 only has a single control chain. Another embodiment of the disclosure which has two control chains is illustrated in FIG. 2 and described further on. It is an advantage of embodiments of the present disclosure that a large number of clusters may be identified and separate control chains assigned to each of them, e.g. there may be 100 or 1000, or more than 1000 clusters and control chains. This large number of clusters provides a fine granularity for the clustered update rates yielding a high image quality and low latencies and energy per area overhead for an update of rather short control chains.

A display comprising pixel elements 110 is connectable to or may be included, for some embodiments of the disclosure, in the data distributing system 100 such that the pixel elements 110 of the display are electrically coupled to respective data output electrodes 103 when the data distributing system 100 is operative. The pixel elements 110 of the display may be formed as electronically controllable cells comprising a phase change material, but are not limited thereto. Liquid crystal materials, electro-optic materials, actively controlled light emitting diodes are other non-limiting examples of electronically controllable pixel elements 110, any particular choice depending on the display type and application. An advantage of phase change material pixel elements 110 is given by the fact that they do not require a constant power supply to remain in their current state; a power source powering the phase change material pixel elements 110 may effectively be disconnected, yet the pixel elements 110 will remember and remain in their latest applied state. Therefore, any suitable memory material may be used for the pixel elements 110 of a holographic projector display if it provides sufficient interaction with light incident on the display, e.g. changing the optical phase, angular distribution, and/or amplitude of incident light via diffraction, reflection, absorption, or combinations thereof. In example embodiments of the disclosure, the display comprising the pixel elements 110 is an integral part of the data distributing system 100, e.g. is formed on top of a semiconductor substrate in which the data distributing system 100 is laid out. For example, the pixel elements 110 are formed as cells, comprising for example a suitable phase change material, which are deposited and patterned on top of a semiconductor substrate such as a silicon substrate which includes the electronic control structures for addressing the individual cells and also includes the data distributing system, e.g. in a vertical back end of line (BEOL) stack. A compact, fully integrated holographic display and data distributing system 100 can be obtained which is also wafer processable, thus well-suited for mass manufacturing at reduced costs and high repeatability. Alternatively, it is possible to provide the data distributing system 100 and the display separately and connect them via suitable connecting means such as wires. Still other embodiments may provide pixel elements 110 at a bottom surface of s semiconductor substrate, e.g. by connecting them by TSVs with the electronic control structures and BEOL stack. In example embodiments of the disclosure, the pixel elements 110 are characterized by very small lateral dimensions, for instance a single pixel element 110 may be as small as 100 nanometer in both lateral dimensions or may be even smaller. Pixel elements 110 of reduced lateral dimensions are particularly useful for holographic displays or other stereoscopic displays that accommodate a larger range of viewing angles, e.g. a full 180 degree viewing angle is achieved even with 400 nm blue light if pixel elements 110 are designed smaller than 200 nm in their lateral dimensions, e.g. designed to have 100 nm in both lateral dimensions. A reduced area occupied by each pixel element 110 also allows the design of more compact displays with a reduced wafer die area necessary for each display which may further decrease manufacturing costs. Alternatively, a given die area for a display may be filled with more pixel elements 110 which is favorable for an increased display aperture yielding better display resolution. In example embodiments of the disclosure, a display comprises at least one megapixel.

In some embodiments of the disclosure, the data switches 105 and/or control switches 104 may be provided as microelectronic transistor devices. For example, the data switches 105 and/or control switches 104 may be provided as pass transistors. This is a benefit for data distributing systems 100 that are characterized by a reduced number of transistors required to build logic gates, e.g. the pass transistor switches, hence reducing energy per area overhead, circuit and routing complexity. In some embodiments of the disclosure, each data switch and/or each control switch may correspond to exactly one transistor device (typically an n-MOS transistor device) controlling the transfer of input data 101 from a data input electrode 102 to a data output electrode 103. In other embodiments of the disclosure, each data switch and/or each control switch may correspond to more than just one transistor device, for instance it may be, but it is not limited thereto, a full complementary n-p CMOS switch, for controlling the transfer of input data 101 from a data input electrode 102 to a data output electrodes 103.

In particular embodiments of the disclosure, the data switches 105 and/or control switches 104 are provided as cheaply fabricated thin film transistors (TFT). TFT technology can be used to vertically stack many TFT layers integrated between the metallization layers of a BEOL process, thus achieving up to ten vertically stacked TFT device layers or more. Accordingly, it is possible to obtain a reduced area for each pixel element of the display and, at the same time, provide the distributed electronic pixel control logic and optional data postprocessing logic locally, at a per pixel basis. In contrast to conventional planar CMOS technology, the energy per area overhead due to the up-and-down routing between die stacks, by means of through-silicon vias (TSV), is avoided, even though a typical TFT node may be scaled to 35 nm to 40 nm. In particular embodiments of the disclosure, the control switches 104 are high threshold voltage, high impedance devices, e.g. tunnel FETs or TFT devices. This realizes low power, low leakage devices. High threshold voltage, high impedance TFT devices can be used, for instance TFT devices implemented with Indium-Gallium-Zinc-Oxide (IGZO) materials or with suitable 2D materials such as graphene, MoS2, etc. The term IGZO encompasses all realizable varieties of the compound $In_xGa_yZn_zO_w$ in terms of the values of the atomic numbers x, y, z, and w, for example $In_2Ga_2ZnO$. However, embodiments of the disclosure are not limited to the devices that combine a high impedance characteristic with a high threshold voltage. Alternative embodiments may implement devices with only high impedance or devices with only high threshold voltages.

For embodiments of the disclosure in which the control switches 104 are implemented as high threshold voltage, high impedance TFT devices, very low leakage currents for a charge stored on the TFT device, e.g. a charge stored on the gate of a pass-gate thin film transistor, can be realized. A single TFT device implemented with IGZO materials, for example, may have leakage currents not higher than 10 fA, e.g. between 1-10 fA, at threshold voltages that may be below 2V. Consequently, the control variables may be preserved for days or even weeks, whereas a typical CMOS device may require a refreshing action of the leaked charge in a regular time interval on the order of seconds, even for a static scene or static portion of a scene which would not require any updating action. The control plane does not need to be updated too often, as it contains most devices. This is realistic for practical scene updates. User-defined quality measures for similarity between subsequent update values may further limit refreshing actions of the control plane and increase the time intervals during which control variables are stored. The data switches 105 can be TFT devices having a lower threshold voltages, e.g. significantly below 2V, e.g. below 1 V, and may be implemented with IGZO material as well. A decrease in the threshold voltage for TFT devices as data switches 105 according to some embodiments of the disclosure is acceptable if the gain in switching frequency is appreciable, for example data switches 105 having switching frequencies greater than 1 MHz, for instance larger than 10 MHz, e.g. switching frequencies of 100 MHz, are appreciated. Data switches 105 operating at faster switching rates are also possible for transferring input data 101 even more rapidly, but is leading to an increase in power consumption. It is generally desired to not maximize switching frequencies but to exploit parallelism in the data distributing system 100 instead, e.g. by providing a plurality of chains that operate in parallel, i.e. that transfer and update input data 101 at data output electrodes 103 that correspond to pixel elements 110 belonging to distinct regions of the display. However, for some embodiments of the disclosure, speed requirements for the data switches 105 prevail, e.g. in applications that demand the highest holographic image quality, e.g. at input data 101 streaming rates larger than about 50 frames per second (fps), e.g. 72 fps for three-color, 24 fps video quality. For those cases, the threshold voltage of the data switches 105 may be lowered to achieve the higher switching frequencies. In contrast thereto, more energy-sensitive applications demand lower input data update rates, e.g. corresponding to input data streaming rates of about 30 frames per second or lower, and in return accept a somewhat lower holographic image quality. For this case embodiments of the disclosure may implement high threshold data switches 105, e.g. having threshold voltages greater than 1V, greater than 2V, or greater than 5V, e.g. 10 V, depending on factors such as the device stack or material choices. As a result thereof, a transferred projection input datum 101 will be efficiently stored on a data output electrode 103, e.g. as a stored charge value, as long as the relevant data switch 105 that connects to that data output electrode 103 is interrupting/blocking and has low leakage characteristics. Implementing the data switches 105 with high threshold voltage CMOS devices (e.g. high-k oxide CMOS), for example, may cause a charge to be stored on the connected data output electrode 103 for several seconds after the CMOS data switch is switched off. This disclosure exploits the reuse of redundancy or repetition of information in the stream of received input data 101. Indeed, if a received projection input datum 101 for transfer to a particular data output electrode 103, or pixel element 110 connected thereto, is identical or similar enough to the previously projection input datum 101 transferred to that data output electrode 103 or connected pixel element 110, it may be more energy-efficient to detect these reuse/repetition patterns and decide to not re-transfer them. Hence, in embodiments of the disclosure that are adapted for such energy-efficient input data 101 reuse, high threshold data switches 105 ensure that a previously transferred projection input datum 101 does not leak away from a particular data output electrode 103. It is expected that typical input data 101 streams show a large amount of these repetitive patterns given the temporal correlations between frames in typical video projection datasets.

In alternative embodiments of the disclosure, planar CMOS technology may be used to implement the transistor devices of the data switches 105 and/or control switches 104, and active device dies may be stacked vertically by means of TSV technology. The very advanced technology nodes, e.g. below 14 nm, e.g. a 10 nm node, may lead to very compact devices and dense logic. Although FIG. 1 is showing single transistor switches as an example for data switches 105 and control switches 104, it is understood that a skilled person knows how to adapt to different types of switches such as many transistor switches, etc.

The system for distributing data 100 of FIG. 1 comprises only one control chain but may also comprise many chains, e.g. hundreds or thousands of chains. Each control chain may be different from another control chain, or one or more control chains may be designed identically. FIG. 2 shows schematically a data distributing system 200 which comprises two different control chains for controlling switching of data switches that share the same data input electrodes 102 but have distinct data output electrodes 103. Data output electrodes 103 are operatively coupled to pixel elements 210 of a display, e.g. a holographic display. Adjacent data output electrodes are coupled to neighboring pixel elements on a display surface, but embodiments of the disclosure are not limited to such a coupling scheme of data output electrodes and pixel elements. The first control chain of the embodiment illustrated in FIG. 2 includes a first delay line 211 and a second delay line 212, and the second control chain also includes a first delay line 217 and a second delay line 218. For this particular embodiment, the first control chain comprises four pairs of matched delay units in both first and second delay line 211, 212, whereas the second control chain comprises only three pairs of matched delay units in both first and second delay line 217, 218. However, embodiments of the present disclosure are not limited to a particular number of paired delay units along the first and second delay line 217, 218 of a control chain as long as the fidelity of signals propagating along these delay lines is not lost, the degree of fidelity loss being determined by the specific application. The illustrative embodiment of FIG. 2 also shows signal generation means which are included in the data distributing system 200. The signal generation means can further be divided into means for generating sequences of control variables 213, 215 and means for generating sequences of enable variables 214, 216. This division, however, is not limiting, and a one more general signal generation means may be provided for generating the many sequences of control variables and/or many sequences of enable variables in a suitable manner, for instance but not limited to running 'ones', e.g. via multiple signal output ports, time-multiplexing of signals, etc. In particular, but not limiting, embodiments of the disclosure, sequences of enable variables may be shared among several control chains, provided that they have the same effect, e.g. running 'ones' may be injected into the second delay lines of more than just a single control chain. This simplifies the circuit design. Still referring to FIG. 2, the sequences of control variables are injected into the first delay line 211 of the first control chain and the first delay line 217 of the second control chain, respectively, whereas the sequences of enable variables are injected into the second delay line 212 of the first control chain and the second delay line 218 of the second control chain, respectively. In an integrated solution, the signal generation means may be integrated into the same semiconductor substrate that contains the data distributing system 200, or they may be provided on a separate die which is connected to the semiconductor substrate that contains the data distributing system 200. However, embodiments of the present disclosure are not limited to a data distributing system 200 that includes the signal generation means. The delay lines of the data distributing system 200 may also be provided without the signal generation means as long as they can be suitably coupled to such signal generation means, which may be external to the data distributing system 200, when the data distributing system 200 is operative. In some embodiments, the data switches 105 and/or control switches 104 may be implemented on different layers and layers may be stacked vertically so as to obtain a compact or even fully integrated version of the data distributing system 200. Referring to FIG. 2, the control switches 2041, 2042 and the data switches 2051, 2052, for example, may be implemented in one single layer, e.g. a first single layer comprising TFT devices, and the control switches 2043, 2044 and the data switches 2053, 2054 may be implemented in a different layer, e.g. a second single layer comprising TFT devices. Both layers, e.g. the first and second layers comprising each TFT devices, may then be stacked together in a BEOL process, e.g. by connecting them via a metal layer interposed between them. The pixel elements 210 of the display are drawn at the top of FIG. 2 for convenience; in embodiments of the disclosure, in which the data distributing system 200 is implemented in a vertical BEOL layer stack, the pixel elements 210 of the display may also be part of this stack, e.g. may be placed on top of the stack.

Figure 3:
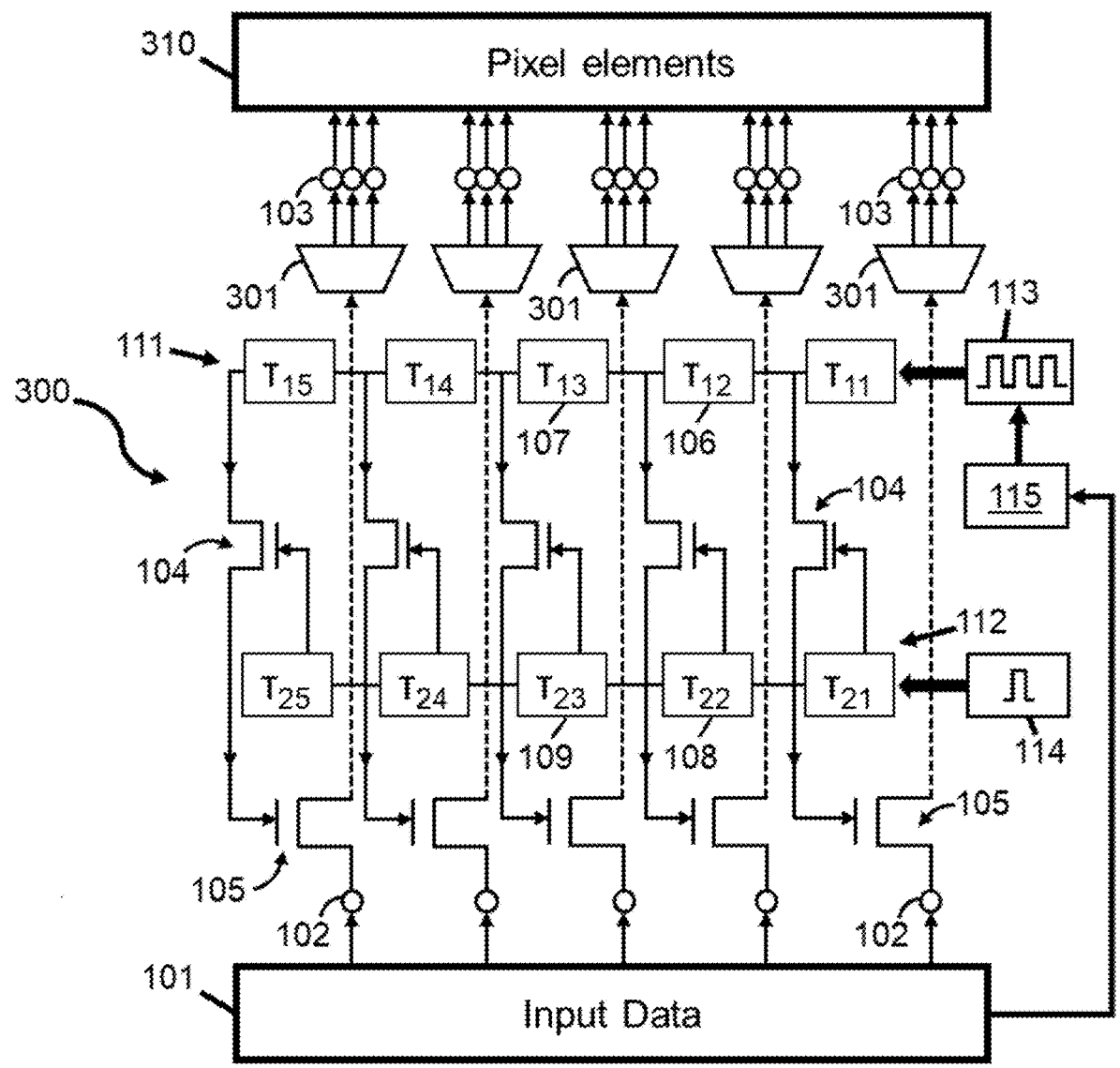
FIG. 3 is a schematic of a system for distributing data according to an embodiment of the present disclosure, wherein the control plane includes a single control chain and distributed means for carrying out local postprocessing computations are provided as local decoders.

FIG. 3 shows schematically a data distributing system 300 according to an embodiment of the disclosure, in which the data distributing system 300 comprises a single control chain. The data distributing system in FIG. 3 resembles the data distributing system 100 in FIG. 1, except that in FIG. 3 the data distributing system 300 is further provided with means for carrying out local postprocessing computations 301 whereby a distributed postprocessing of transferred input data 101 at one or more data output electrodes 103 is enabled. Examples of local postprocessing computations 301 include local decoding, identifying whether pixel values have changed compared to a previous value that was stored on the display (with the phase change material cells, for instance), applying (geometrical) transformations to the transferred input data, or error detection and/or correction. For the embodiment with identification of change of pixel values the comparison takes less energy than writing the memory cell of the pixel element. When pixel values are mostly similar between successive updates this can bring substantial overall energy saving.

For the particular embodiment shown in FIG. 3, the means for carrying out local postprocessing computations are decoders (e.g. implemented as TFT circuits) suitable for decoding encoded information that is contained in the transferred input data 101, e.g. for interpreting the primitives. Decoding transferred information locally and in a distributed way, e.g. at the level corresponding to a single pixel or groups/clusters of pixels, may be desirable. A data distributing system 300 with distributed local decoding means may, for example, be operated at higher input data rates, e.g. at rates in the order of Tbps, as the input data 101 can remain in a highly compressed representation until it is distributed to a target location, e.g. to one or more data output electrodes corresponding to one or more pixel elements of the display. Moreover, using error correction codes for the transmission of input data 101 from a input data providing unit, e.g. an external storage disk, to a target location, e.g. a target pixel element of the connectable display, and local postprocessing computations means that include error detection and error correction circuitry, an error which occurred during transmission may be detected and corrected locally, not affecting or slowing down the transfer of input data 101 to other locations. Furthermore, providing the decoders which act on the transferred input data 101 provides the number of wires desired for data distribution is reduced compared to a data distributing system for which the decoding is performed prior to the distribution and transfer of (decoded) input projection data 101. This reduction in wires is also saving design area and, because the overall capacitance goes down, it also reduces the energy per area overhead which is due to the repeated capacitive loading of wires. There is a trade-off between the extra postprocessing functionality provided by the distributed means for carrying out local postprocessing and the local logic overhead which is also occupying design space and contributing to the energy per area overhead. It will be appreciated by the skilled person that the local postprocessing means can be implemented in any suitable device technology, for instance, without, however, being limited thereto, TFT technology. As examples, TFT devices implemented with Indium-Tin-Zinc-Oxide (ITZO) materials, or with Indium-Gallium-Zinc-Oxide (IGZO) materials or with suitable 2D materials such as graphene, $MoS_2$, etc. may be used for implementing the postprocessing means. The terms ITZO and IGZO, respectively, encompass all realizable varieties of the compounds $In_xSn_yZn_zO_w$ or $In_xGa_yZn_zO_w$, respectively, in terms of the values of the atomic numbers x, y, z, and w, for example $In_2Ga_2ZnO$. Besides TFT, also other devices, and even monolithically stacked CMOS devices can be an option. As an example TFT MOIL stack technology may be used, without being limited thereto. It is appreciated, however, that embodiments of the disclosure using TFT technology in a BEOL stack may benefit from the fact that the low leakage currents of TFT devices is enabling pass transistor logic which typically requires less components in a logic gate and, additionally, may not require the implementation of latches or registers as typically is the case in a full CMOS solution. In some embodiments, a decoded transferred projection input datum may, for example, be a multi-bit voltage signal representing a discrete voltage or current level in a range of pixel element output voltages or currents for modifying the solid phase of a phase-change material or memory material of a pixel element. In other embodiments, a decoded transferred projection input datum may be a multi-bit voltage signal representing information for modifying a group of pixel elements, e.g. for modifying a red, a green, and a blue pixel element, which, together, form a color pixel of the display. In this case the pixel elements of the display are provided with a suitable color filter.

Figure 4:
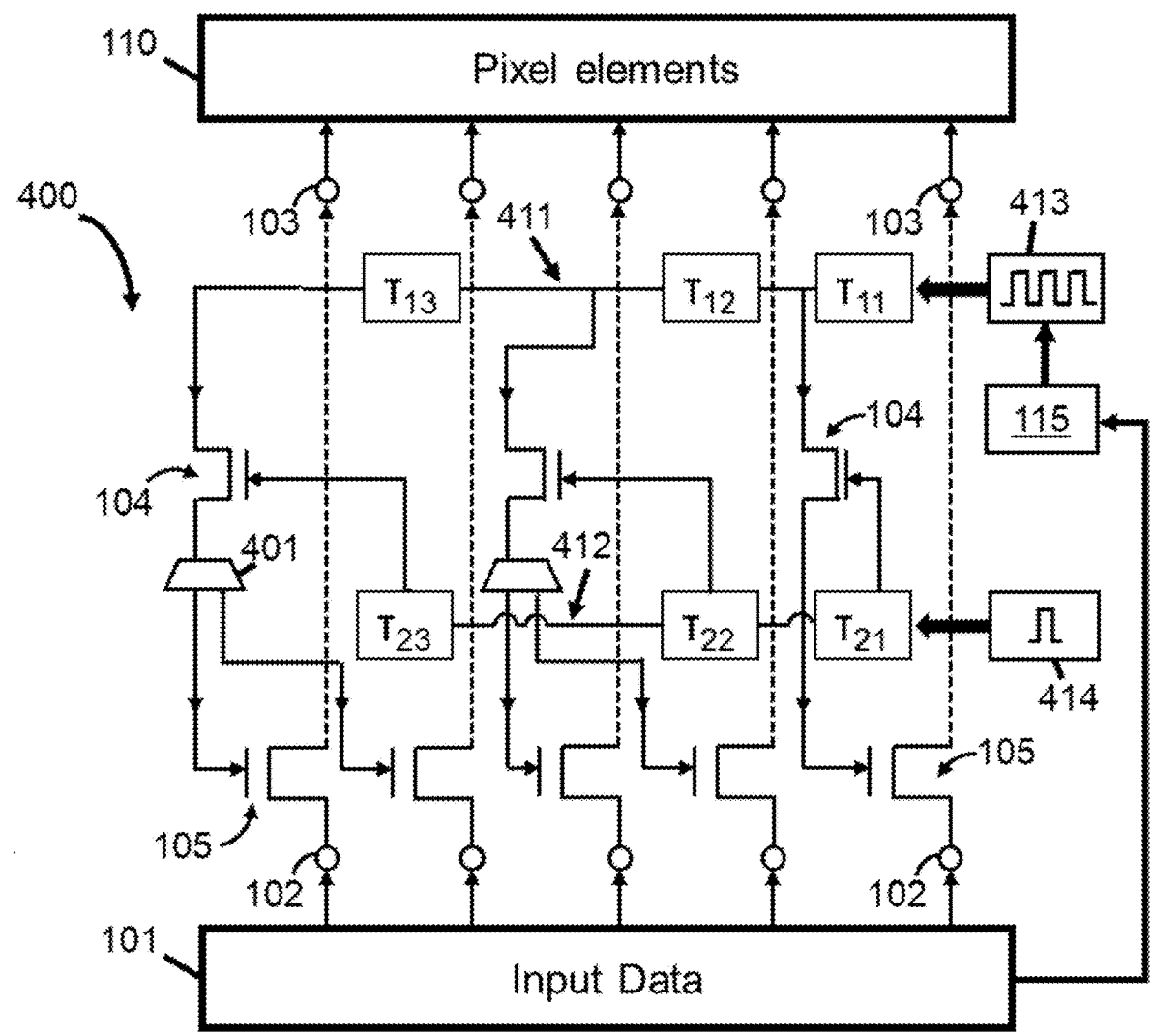
FIG. 4 illustrates an embodiment of the disclosure in which a sequence of control variables is encoded.

FIG. 4 illustrates an embodiment of the disclosure in which a sequence of control variables is encoded. A single control chain of the data distributing system 400 resembles the chain in FIG. 1 except that the first delay line 411 and the second delay line 412 are adapted for decoding encoded control variables in a sequence of control variables propagating along the first delay line 411. A means for generating encoded sequences of control variables 413 is operatively connected to at least the first delay line 411 of the chain and may be included in the data distributing system 400 in some embodiments. One or more decoders 401 are connected to the first delay line 411 via respective control switches. Therefore, a single encoded control variable, e.g. encoded control bits, can be selected from a position along the first delay line 411 by a control switch which received, at that moment in time, an enable variable from the second delay line 412 whereby the control switch is opened. The single encoded control variable is directed to the decoder 401 with the result that the single encoded control variable is decoded into a set of decoded control variables which are sent to a corresponding set of data switches for trolling the transfer of input data 101.

Figure 5:
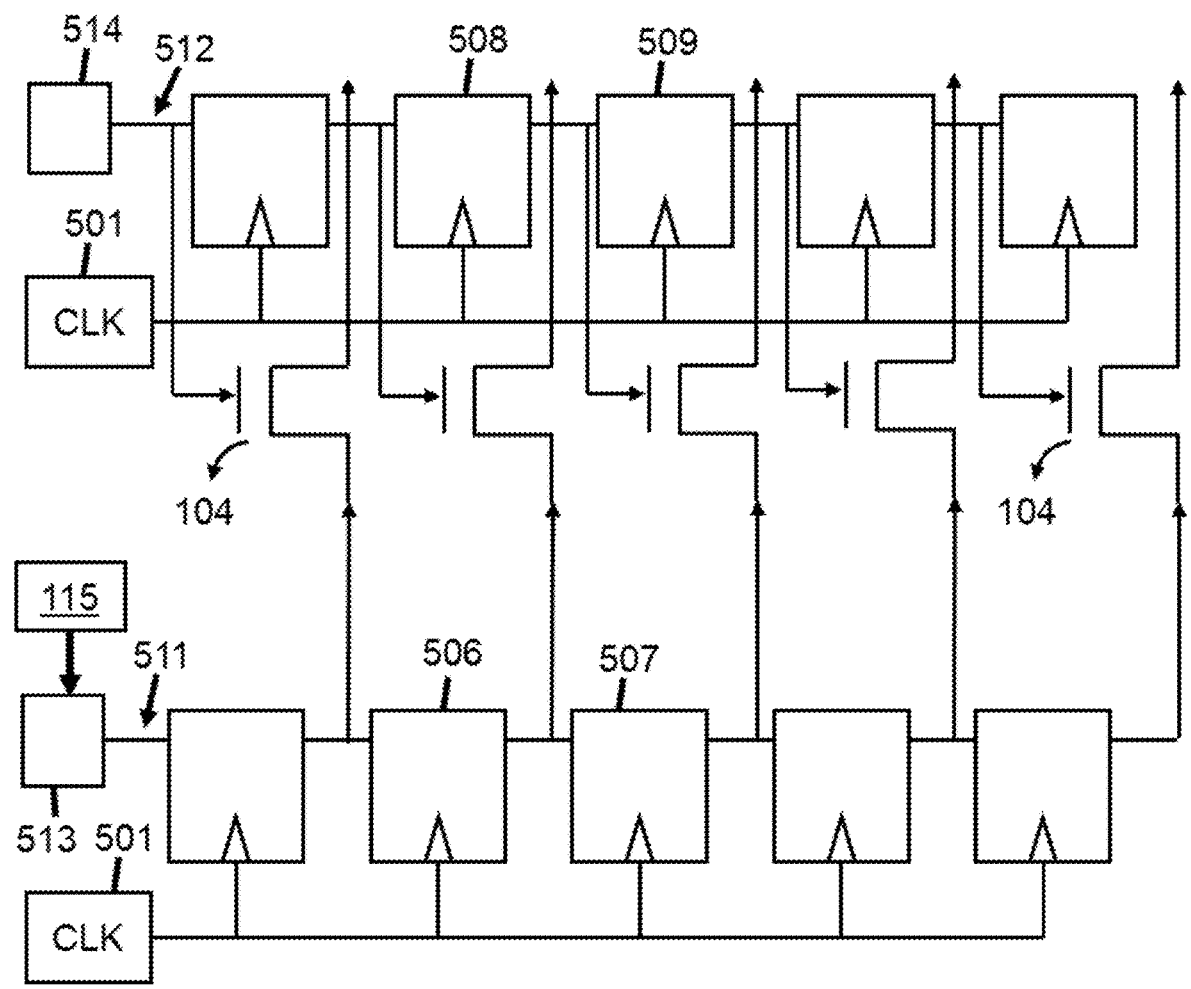
FIG. 5 illustrates how pairwise matching between delay units of a first and a second delay line of an embodiment of the disclosure is obtained by the distribution of a synchronous clock signal.

FIG. 5 illustrates delay lines 511, 512 whose pairwise matched delay units have delay times that are in a synchronized relationship. For this particular embodiment, the synchronization of delay times is obtained by the distribution of a synchronous clock signal. A clock signal generating means 501 may be included in the data distributing system or may be provided as an external unit. The synchronous clock signal generated by the clock signal generating means 501 is distributed to the delay units of the fist delay line 511 and the delay units of the second delay line 512. According to such an embodiment, the delay lines 511, 512 may comprise clocked shift registers as delay units 506, 507, 509, and 509. The registers are adapted for executing a shifting operation on a sequence presented at their inputs, e.g. the sequences of control variables and the sequences of enable variables generated by their respective means, e.g. signal sources 513, 514, if an applied clock signal undergoes a prescribed transition. In some embodiments of the disclosure, a delay time of a delay unit of the second delay line of the chain is, within acceptable error margins, twice a delay time of a corresponding delay unit of the first delay line. For the example embodiment of FIG. 5 this can be obtained by triggering the delay units 506, 507 of the first delay line 511 on both the rising and the falling edge of a two-edge dock signal, i.e. every half-cycle of a regular, periodic clock signal, whereas the corresponding delay units 508, 509 of the second delay line 512 are only triggered once in a complete clock cycle, e.g. only triggering on falling edges of the clock signal. Alternatively, if the sequences of control variables and the sequences of enable variables are bit sequences, delay units 506, 507 of the first delay line 511 may be n-bit shift registers, e.g. 1-bit registers, whereas the corresponding delay units 508, 509 of the second delay line 512 may be 2n-bit shift registers, e.g. 2-bit shift registers. As described in previous embodiments, selected control variables passing control switches 104 are directed to the data switches for controlling the transfer of input data 101. Passed control variables may be efficiently stored (low leakage currents) as charges on the gate capacitors of transistor devices, e.g. TFT devices, which can be used to implement the data switches. Delay lines implemented with synchronized shift registers allow for an accurate synchronization of delay times of corresponding delay units. Moreover, the shift registers can be used to restore the signal levels of shifted sequence variables thereby achieving better signal fidelity for signals propagating along these delay lines, e.g. the loss of signal fidelity due to signal fading is limited. Another aspect resides in the fact that the shift registers, e.g. CMOS shift registers, can be shut off completely after each injection and propagation cycle thereby reducing static power consumption when the delay lines are idle.

In a second aspect the disclosure relates to a 3D light field projection device, e.g. a holographic display, which comprises a data distributing system of the first aspect. The 3D light field projection device also includes a display having pixel elements with the pixel elements being coupled to the data output electrodes of the data distributing system. A plurality of pixel elements are arranged on a display surface, which can be a planar surface. However, for some embodiments relating to the projection device it may be useful to arrange the plurality of pixel elements on a flexible substrate. The display may be mounted or removably attached to an uneven, non-planar support structure, and also withstands higher flexural strain. The display and the pixel elements of the display may share some or all of the properties already described in respect of previous embodiments relating to the first aspect of the disclosure, in particular in respect of the description relating to FIG. 1. For example, in some embodiments of the projection device, the pixel elements comprise a phase change material that has a memory function, i.e. it stays in the state to which it was brought by the signal that has been applied last, even in the case in which no energizing signal is provided any longer. Pixel elements of the display may be grouped together. In some embodiments have adjacent pixel elements grouped together to implement color pixels, e.g. by applying a color mask or a color filter to the pixel elements such that a red, a green, and a blue pixel element are neighboring pixel elements on the display surface.

For some embodiments of the projection device, the data distributing system may work with a particular display or a particular region of a display as explained in more detail hereafter.

Figure 6:
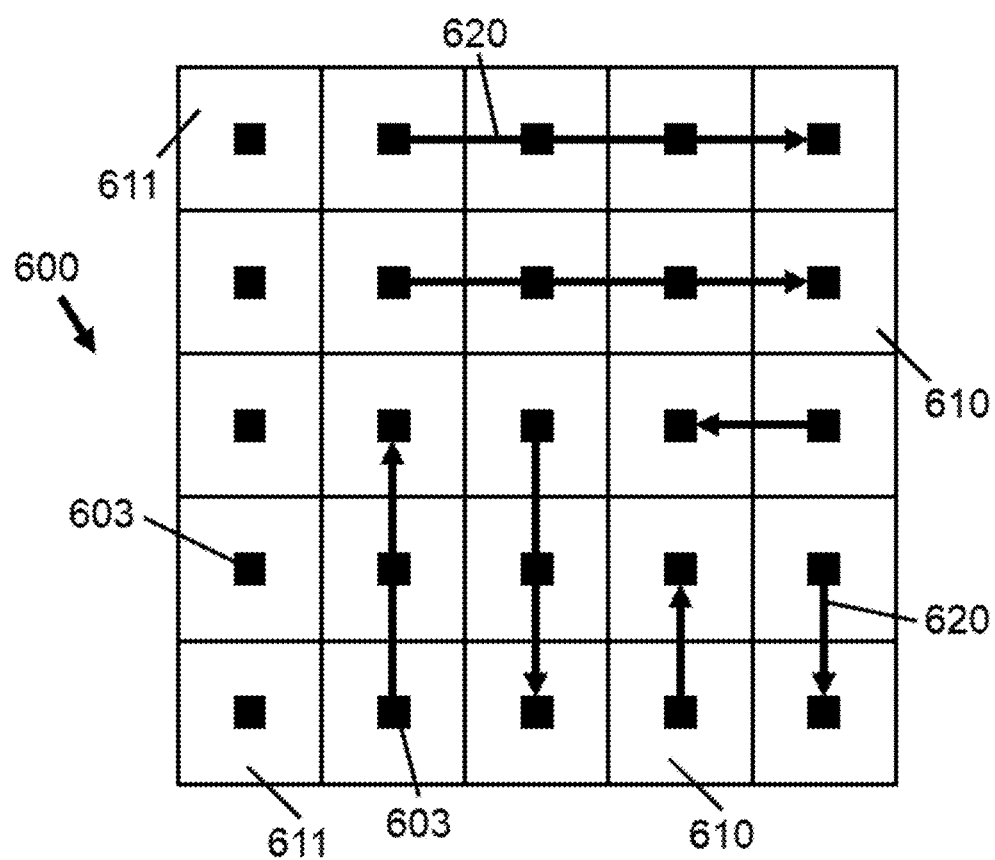
FIG. 6 illustrates a planar display comprising pixel elements, each pixel element being connected to a data output electrode, and individual pixel elements being connected by curves.

FIG. 6 illustrates a planar display 600 comprising pixel elements 610, each pixel element 610 being connected to a data output electrode 603. As explained before, the update of control variables at the data switches of a control chain can be a sequential, time-ordered process (wave pipelining) and the data switches at which control variables are consecutively updated can be ordered accordingly. The wave pipelining process can cause the highest input data throughput and the lease area/energy overhead. However, an external host (e.g. a PC) controlling the control chains of the control plane has to compute offline or upfront which control sequences and enable sequences to apply in order to orchestrate everything. That offline phase (which can be a very complex software tool) will make sure that the feeding of the input data (e.g. from the external storage device) happens in a synchronized way with the feeding of the control chains of the control plane. In case of wave pipelining, this orchestration becomes highly complex, hence the offline phase becomes costly. Alternatively, this offline calculation can be prevented and pushed to the online phase. In such implementation, the new control variables of all control chains for controlling the data switches are loaded first, and only then input data is distributed on the updated data paths. Until the moment where all new control variables are present, there are two options for the distribution of loaded input data. Either the input data is loaded without interruption and distributed on the previously assigned data paths as the new data paths are not yet completely updated, or a stall for loading new input data is enforced. The former option may require extra circuitry to store the old control variables (e.g. behind a TFT pass transistor) and then, in one shot, to update all the old control variables (e.g. with an extra external control bit). The latter option means the old pixel values (corresponding to input data previously routed to this pixel element) are temporarily kept on the display. Given the very high rate (10-100 MHz) at which this control variable loading happens, this may not be an issue, because the update rate for data output electrodes to which pixel elements are connected does not need to be faster than 100 Hz.

As each data switch enables the transfer of input data to a particular data output electrode, and hence to a particular pixel element or group of pixel elements of the display connected thereto, the ordering of data switches, driven by control sequences of a control chain, leads naturally to an ordering of the addressed pixel elements or group of pixel elements on the display surface. Connecting the geometric centers of addressed pixel elements in that order results in a curve that is defined and restricted to the display surface. Addressed groups of pixel elements are hereby considered as a block pixel or macro-pixel entity being represented by only one point on the curve. As a result, each cluster of data output electrodes, and connected pixel elements, is provided with at least one control chain. Usually one control chain per cluster will be provided, but if the control chain becomes too long (e.g. in terms of latency for updating pixel elements), it can be broken up into a plurality of control chains. The control chain(s) associated to a cluster control the update rates of pixel elements in that cluster and a change of update rates in that cluster is performed sequentially along a curve connecting (block) pixel elements of that cluster. Therefore, it is also possible to design particular chains such that they exhibit desirable update sequence shapes (fine granularity) within a cluster.

For some embodiments of the present disclosure, the sequences of control variables and enable variables are precomputed (off-line calculation) during system design time, e.g. a limited set of instruction sequences is created and used during system use. For other embodiments of the present disclosure, the sequences of control variables and enable variables are generated at system run-time with the benefit of achieving more flexibility and of not having to build a fully predefined instruction set at design-time any longer. Based on design-time profiling, a proper set of run-time seed scenarios grouping the most likely to occur input data sets (streams) and their corresponding sequences of control and enable variables is determined such that the granularity (defining "shapes" of update sequences) thereof is much smaller than the final grain size of control and enable variable sequences used by the control plane during system run-time. At run-time, starting with the available seed scenarios of likely input data sets to occur, combinations thereof may be formed such that larger composite 'likely' input data sets and related control/enable variable sequences will develop and which, in consequence, will cover larger surfaces or volumes of the 2D or 3D holographic transducer, respectively. This may be achieved by a run-time decision engine which explores the most promising composites and, based thereon, performs the final implementation of both the control/enable variable sequences for the control plane and the 'likely' data sets for the data plane. The streamed input data is approximated by a combination of seed scenario data sets. Additionally, particular embodiments of the present disclosure may also decide on design-time rules/conditions which govern the way the primitive seed scenario clusters can be combined into the composites, whereby the amount of exploration effort and time that has to be spent at run-time is further limited.

In some embodiments of the disclosure, a plurality of control chains is thus corresponding to a plurality of such curves, and in some embodiments, the curves are non-intersecting on the display surface. Such curves do not cross themselves, nor do they cross other curves on the display surface. However, the skilled person will appreciate that the non-intersecting curves are not limiting embodiments of the disclosure, as known 3D BEOL stack technology does also allow for intersecting curves to be designed if appropriate for the desired application. In the same or other embodiments, such curves connect neighboring (block) pixel elements on the display surface. Here neighboring (block) pixel elements refers to (block) pixel elements that are nearest neighbors. An example therefore is shown in FIG. 6 wherein a plurality of curves on the display surface correspond to a plurality of straight lines 620 and no two such straight lines do intersect. The straight lines 620 may be oriented differently and may be of different lengths. It is also possible that the display 600 comprises other pixel elements 611 which are not subject to partial updates an may not even be actively used for projection, and therefore, no curve can be prescribed for such pixel elements 611. It will be appreciated by the skilled person that not all the pixel elements of the display are contributing to the creation of a 3D light field. Some pixel elements may be hidden by a display panel or may serve a different purpose, e.g. are used for display feedback, display calibration, sensory measurements, etc. In FIG. 6, a column of pixel elements 611 is an exemplary example arrangement of pixel elements used for display calibration, but other arrangements are possible and are not restricted to particular rows or columns.

Figure 7:
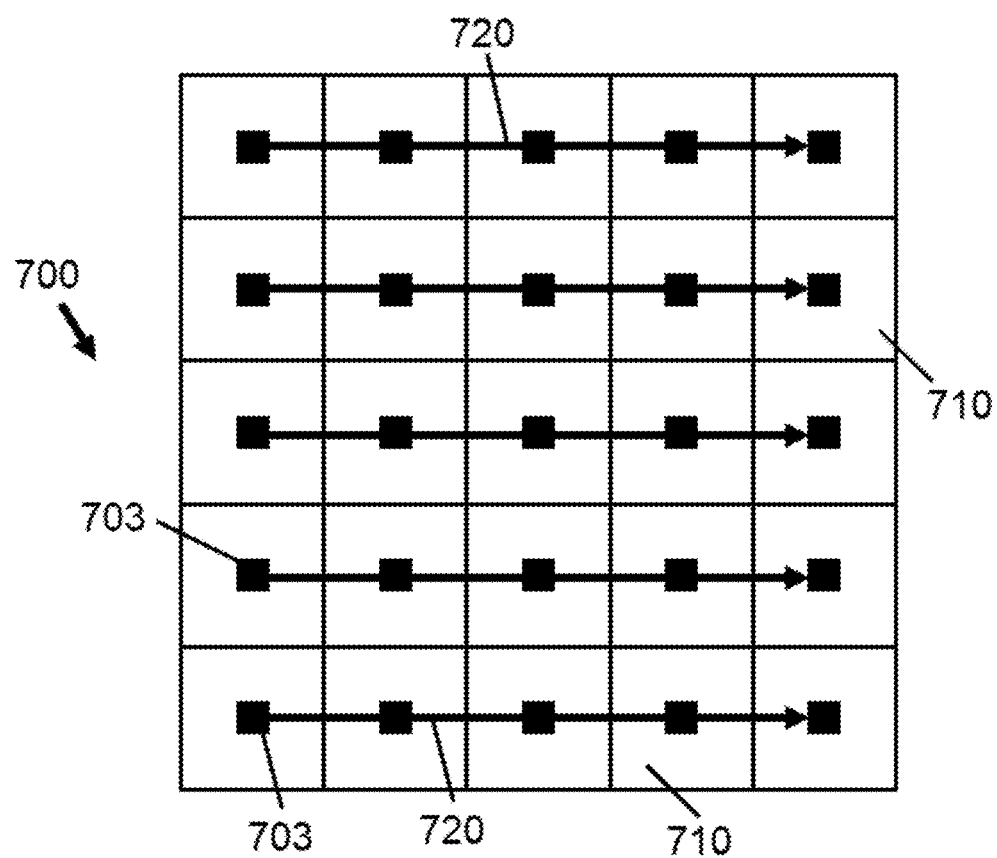
FIG. 7 illustrates a planar display comprising pixel elements, for which individual pixel elements are connected by straight lines.

FIG. 7 illustrates a planar display 700 comprising pixel elements 710 wherein each pixel element is coupled to a corresponding data output electrode 703 and a plurality of pixel connecting curves 720 are shaped as a set of parallel straight lines on the display surface. For this particular embodiment, each curve, and hence each underlying control chain, corresponds to a row of pixel elements of the display 700. This configuration facilitates the underlying circuit design and the floor planning for routing.

Figure 8:
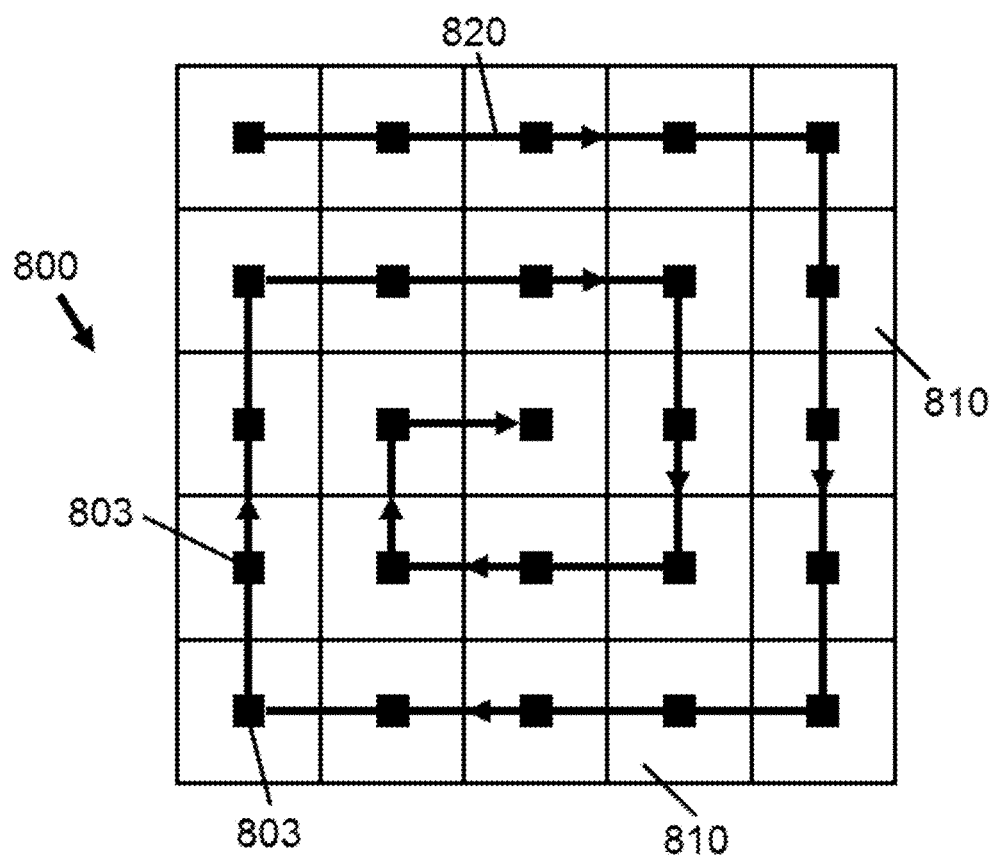
FIG. 8 illustrates a planar display comprising pixel elements, for which individual pixel elements are connected by a curve which is a space-filling winding curve along which straight curve segments are joined by right angle turns.

FIG. 8 illustrates a planar display 800 comprising pixel elements 810 wherein each pixel element is coupled to a corresponding data output electrode 803 and a single pixel connecting curve 820 is shaped as a space-filling winding curve along which straight curve segments are joined by right angle turns, in this case a right-angled inward spiraling, snake-like curve.

Figure 9:
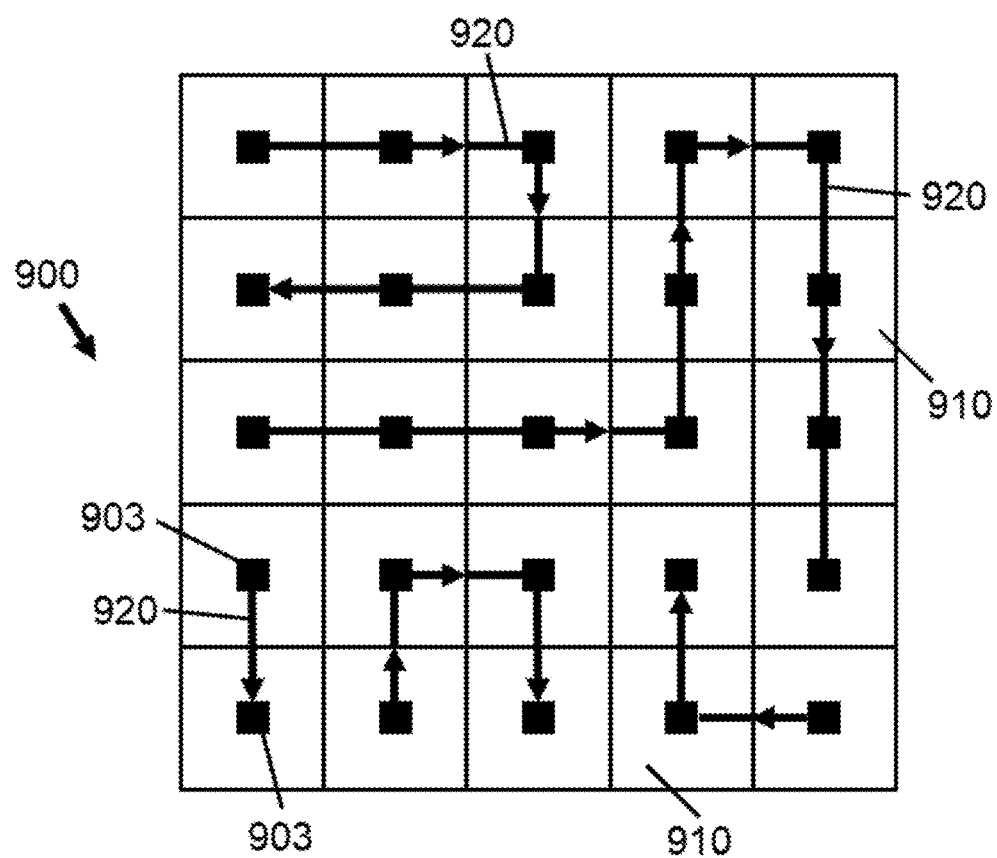
FIG. 9 illustrates a planar display comprising pixel elements, for which individual pixel elements are connected by multiple curves which are a space-filling winding curves along which straight curve segments are joined by right-angled turns.

FIG. 9 illustrates a planar display 900 comprising pixel elements 910 wherein each pixel element is coupled to a corresponding data output electrode 903 and many pixel connecting curves 920 are shaped as space-filling winding curve along which straight curve segments are joined by right angle turns. The set of space-filling winding curves 920 form disjoint clusters of pixel elements, and their union covers the entire display 900.

Figure 10:
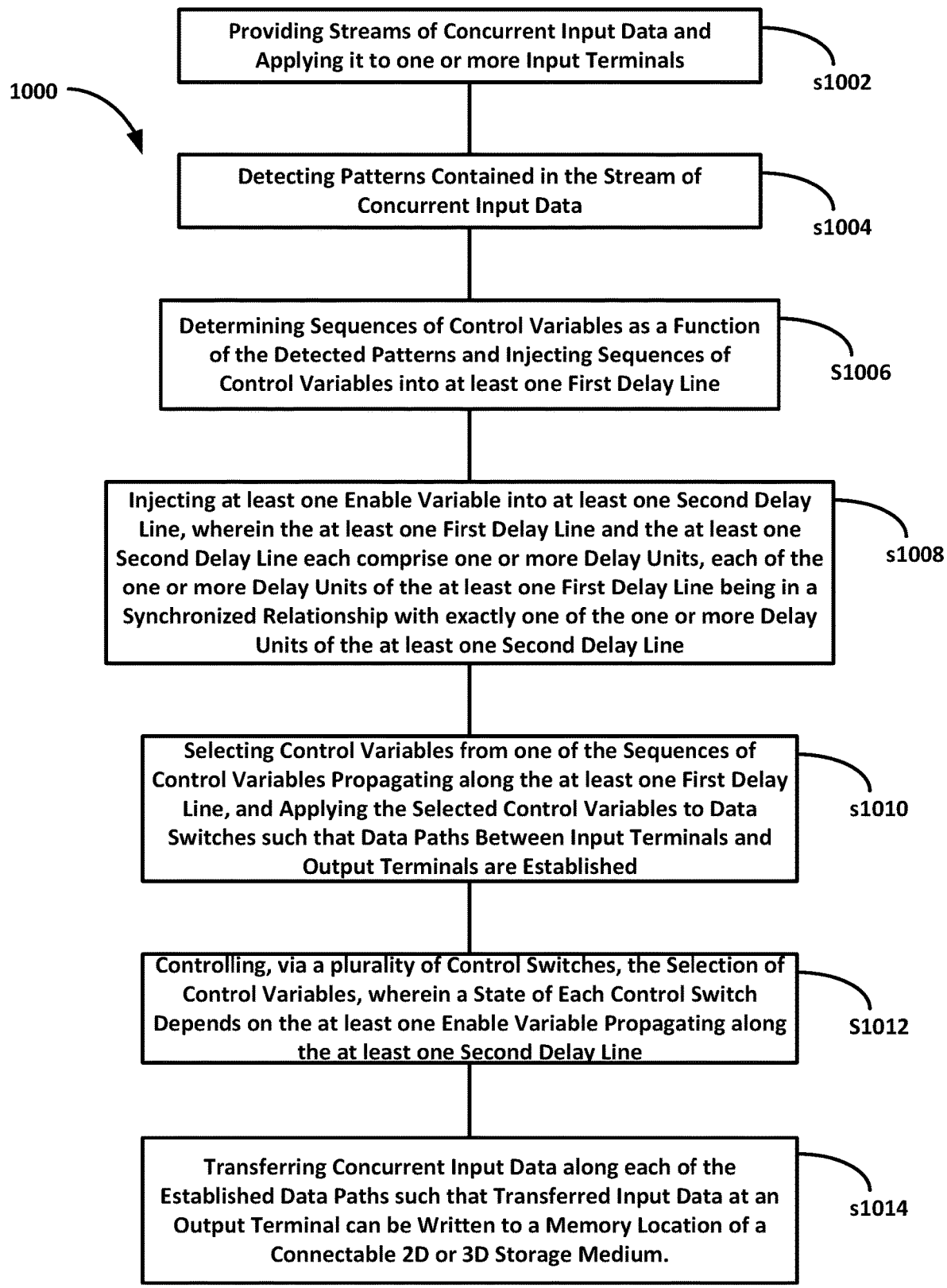
FIG. 10 is a flowchart illustrating a method of distributing streams of concurrent input data to a 2D or 3D storage medium for writing.

FIG. 10 is a flowchart 1000 illustrating a method of distributing streams of concurrent input data to a 2D or 3D storage medium for writing. The method comprising the following steps. At step s1002, the method includes providing streams of concurrent input data (101) and applying it to one or more input terminals (102). At step s1004, the method includes detecting patterns contained in the stream of concurrent input data (101). At step s1006, the method includes determining sequences of control variables as a function of the detected patterns and injecting sequences of control variables into at least one first delay line (111). At step s1008, the method includes injecting at least one enable variable into at least one second delay line (112), wherein the at least one first delay line (111) and the at least one second delay line (112) each comprise one or more delay units (106, 107; 108, 109), each of the one or more delay units (106, 107) of the at least one first delay line (111) being in a synchronized relationship with exactly one of the one or more delay units (108, 109) of the at least one second delay line (112). At step s1010, the method includes selecting control variables from one of the sequences of control variables propagating along the at least one first delay line (111), and applying the selected control variables to data switches (105) such that data paths between input terminals (102) and output terminals (103) are established. At step s1012, the method includes controlling, via a plurality of control switches (104), the selection of control variables, wherein a state of each control switch depends on the at least one enable variable propagating along the at least one second delay line (112), and at step s1014, the method further includes transferring concurrent input data along each of the established data paths such that transferred input data at an output terminal can be written to a memory location of a connectable 2D or 3D storage medium.

While the disclosure has been illustrated and described in detail in the drawings and foregoing description, such illustration and description are to be considered illustrative or exemplary and not restrictive. The foregoing description details certain embodiments of the disclosure. It will be appreciated, however, that no matter how detailed the foregoing appears in text, the disclosure may be practiced in many ways. The disclosure is not limited to the disclosed embodiments.

Other variations to the disclosed embodiments can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A system for distributing data for 3D light field projection, the system comprising:
   a plurality of input terminals suitable for receiving a stream of input data, and a plurality of output terminals being connectable to pixel elements of a display;
   a plurality of data paths between input terminals and output terminals;
   a plurality of data switches, each suitable for controlling, via control variables, a transfer of input data, when received at the input terminals, on a data path between the plurality of input terminals and the plurality of output terminals;
   a control plane adapted for applying control variables to the data switches, the control plane comprising a plurality of control switches for selecting, via enable variables, one or more control variables from sequences of control variables and applying the one or more control variables to the data switches, wherein the control plane includes at least one first delay line suitable for propagating sequences of control variables, and at least one second delay line suitable for propagating sequences of enable variables, and wherein the at least one first delay line and the at least one second delay line further includes each one or more delay units, and each of the one or more delay units of the at least one first delay line being in a synchronized relationship with exactly one of the one or more delay units of the at least one second delay line; and
   a local postprocessor configured for detecting patterns contained in the stream of input data, when received during system run-time, the detected patterns determining the sequences of control variables.

2. The according to claim 1, wherein the local postprocessor implements computations on transferred input data for at least one of the plurality of output terminals.

3. The system according to claim 2, wherein the local postprocessor configured for detecting patterns is further configured to control the execution of local postprocessing computations.

4. The system according to claim 2, wherein the local postprocessor further implements local data decoders operating on transferred input data.

5. The system according to claim 2, wherein the local postprocessor includes a circuit for identifying whether newly transferred input data for at least one of the plurality of output terminals has been changed compared to input data previously transferred to that output terminal.

6. The system according to claim 1, wherein the plurality of data switches or the plurality of control switches comprises at least one thin film transistor.

7. A 3D light field projection device comprising the system for distributing data according to claim 1, and a display comprising pixel elements arranged on a display surface, each output terminal of the plurality of output terminals being connected to and addressing at least one pixel element such that a transfer of received input data to output terminals is causing a updating of the addressed pixel elements.

8. The projection device according to claim 7, wherein the sequential selection of each control variable from a sequence of control variables propagating along the at least one first delay line defines a corresponding sequence of pixel elements such that a curve sequentially connects the pixel elements of the corresponding sequence on the display surface.

9. The projection device according to claim 8, wherein one sequence of control variables is determining at least one curve of updated pixel elements on the display surface, the updated pixel elements along the at least one curve being addressed sequentially by the order of selection of control variables from the sequence, the at least one curve connecting neighboring pixel elements of the display.

10. The projection device according to claim 8, wherein at least one curve is a space-filling winding curve along which straight curve segments are joined by right-angled turns such that the curve connects all the pixel elements belonging to a connected region of the display.

11. The projection device according to claim 7, wherein a plurality of disjoint clusters of pixel elements provides a spatial partitioning of the display, the pixel elements of each cluster having similar update rates for each stream of input data out of a collection of representative streams.

12. The projection device according to claim 11, comprising a splitter for splitting a received stream of input data into several smaller chunks of input data and for applying these smaller chunks of input data to the data input electrodes of more than one cluster.

13. The projection device according to claim 11, wherein a shape of each of the plurality of disjoint clusters in the display plane is assigned at design-time, based on histograms obtained through profiling of the system for distributing data, when fed with a collection of representative streams.

14. The projection device according to claim 11, wherein the update rates of pixel elements of each cluster are adapted dynamically, at run-time, by the means for detecting patterns.

15. A method of distributing streams of concurrent input data to a 2D or 3D storage medium for writing, the method comprising:

providing streams of concurrent input data and applying it to one or more input terminals;

detecting, by a local postprocessor, patterns contained in the stream of concurrent input data;

determining, by the local postprocessor, sequences of control variables as a function of the detected patterns and injecting sequences of control variables into at least one first delay line;

injecting, by the local postprocessor, at least one enable variable into at least one second delay line, wherein the at least one first delay line and the at least one second delay line each comprise one or more delay units, each of the one or more delay units of the at least one first delay line being in a synchronized relationship with exactly one of the one or more delay units of the at least one second delay line;

selecting control variables from one of the sequences of control variables propagating along the at least one first delay line, and applying the selected control variables to data switches-such that data paths between input terminals and output terminals are established;

controlling, via a plurality of control switches, the selection of control variables, wherein a state of each control switch depends on the at least one enable variable propagating along the at least one second delay line; and transferring concurrent input data along each of the established data paths such that transferred input data at an output terminal can be written to a memory location of a connectable 2D or 3D storage medium.

\* \* \* \* \*